(12) United States Patent
Kim et al.

(10) Patent No.: US 6,529,086 B2
(45) Date of Patent: Mar. 4, 2003

(54) ENCODING/DECODING APPARATUS FOR ORIENTATION INTERPOLATOR NODE DATA

(75) Inventors: Sung-jin Kim, Kyungki-do (KR); Do-kyoon Kim, Kyungki-do (KR); Seok-yoon Jung, Seoul (KR); Sang-oak Woo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/981,802

(22) Filed: Oct. 19, 2001

(65) Prior Publication Data
US 2002/0070818 A1 Jun. 13, 2002

(30) Foreign Application Priority Data
Oct. 20, 2000 (KR) .......................................... 2000-61985
Jul. 7, 2001 (KR) .......................................... 2001-40706

(51) Int. Cl.[7] ................................................ H03K 7/00
(52) U.S. Cl. ..................... 332/106; 348/390.1; 375/240
(58) Field of Search .......................... 332/106; 375/271, 375/253, 281, 240, 244, 245; 348/724, 390.1; 341/143

(56) References Cited

U.S. PATENT DOCUMENTS

| | | | | |
|---|---|---|---|---|
| 4,858,005 A | * | 8/1989 | Lodge ................... | 375/240.12 |
| 5,111,292 A | * | 5/1992 | Kuriacose et al. .......... | 348/469 |
| 5,122,875 A | * | 6/1992 | Raychaudhuri et al. ... | 348/390.1 |
| 5,168,356 A | * | 12/1992 | Acampora et al. .......... | 370/473 |
| 5,231,487 A | * | 7/1993 | Hurley et al. ............... | 348/472 |
| 6,084,908 A | * | 7/2000 | Chiang et al. ......... | 375/240.03 |

* cited by examiner

Primary Examiner—Robert Pascal
Assistant Examiner—Joseph Chang
(74) Attorney, Agent, or Firm—Burns, Doane, Swecker & Mathis, L.L.P.

(57) ABSTRACT

An encoding/decoding apparatus and method for an orientation interplator node are provided. The encoding/decoding apparatus for an orientation interpolator node, which provides rotational information of an object in a 3-dimensional space, is formed of "key information" which indicates a time when a rotational movement occurs and "key value information" which indicates a rotational posture corresponding to the time. A predictive coding apparatus is used in the encoding process for compressing the information of the key and key value information. Therefore, in encoding an input orientation interpolator node in an information compression method of a predictive encoding method, the efficiency of encoding is improved and an reverse rotation due to an encoding error from lossy coding can be corrected.

5 Claims, 18 Drawing Sheets

FIG. 5
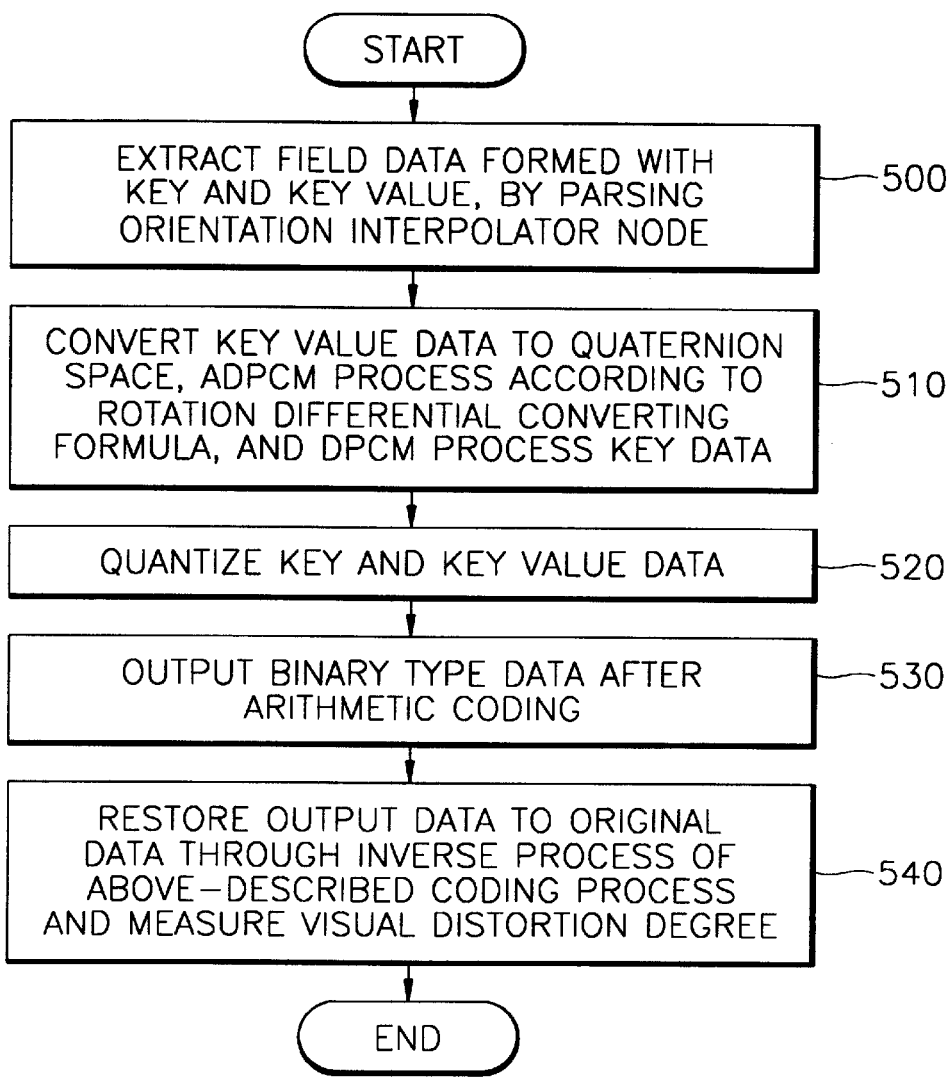
FIG. 6
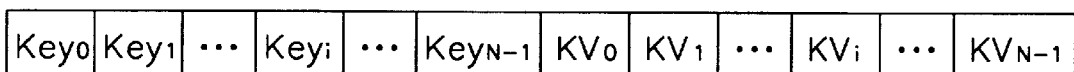
(a) STREAM STRUCTURE HAVING DELAY
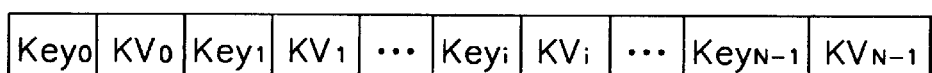
(b) STREAM STRUCTURE FOR REAL TIME PROCESSING

FIG. 7

(a) PRIOR ART MPEG-4 BIFS

| Class QuantizeField(FieldData field) { | Data Type | # of bits |
|---|---|---|
| switch (field.quantType) { | | |
| case 9 : | | |
| direction ; | int | 1 |
| case 10 : | | |
| orientation ; | int | 2 |
| default : | | |
| break ; | | |
| } | | |
| } | | |

(b) IMPROVED MPEG-4 BIFS

| Class QuantizeField(FieldData field) { | Data Type | # of bits |
|---|---|---|
| switch (field.quantType) { | | |
| case 9 : | | |
| direction ; | int | 1 |
| case 10 : | | |
| if(isFirstField) | | |
| orientation ; | int | 2 |
| default : | | |
| break ; | | |
| } | | |
| } | | |

ENCODING/DECODING APPARATUS FOR ORIENTATION INTERPOLATOR NODE DATA

BACKGROUND OF THE INVENTION

1. Field of the Invention

The present invention relates to a encoding/decoding apparatus and method for an orientation interpolator node.

2. Description of the Related Art

The MPEG-4 Binary Format for Scenes (BIFS) supports a key frame animation technique which uses an interpolator node data formed of field data in which animation information is expressed in a key and key values. The key frame corresponds to a scene which is a base in computer animation. In the key frame animation method, in order to provide smooth animation, piecewise linear interpolation in a large amount of key and key value data is needed. Due to this characteristic, the MPEG-4 BIFS improves data transmission efficiency by quantizing field data in each interpolator node and then compressing the data.

One interpolation method using information on the rotation of an object expresses rotational motion with rotation axes and a rotation angle. Like a Virtual Reality Modeling Language (VRML), the MPEG-4 BIFS supports rotational motion, which is expressed with rotation axes and a rotation angle as described above, through an orientation interpolator node.

Since data sets having linear interpolation characteristics have higher correlation between successive data sets, it is efficient to use a differential coding method using differential values between successive data sets. In the MPEG-4 BIFS, two representative methods are used for encoding field data which is represented by a key and key values of an orientation interpolator node and is to be processed: a method not using Differential Pulse Code Modulation (DPCM) and a method using the DPCM.

First, in the method not using the DPCM, only quantization is performed with respect to keys and key values of data to be encoded. Therefore, because the characteristics of data to be encoded is not considered, the method is inefficient. The method not using the DPCM will now be explained briefly. The field data of an orientation interpolator node is applied and the key values of the field data are converted into values in a quaternion space. Next, the key and key values are quantized. Next, the quantized binary data is restored to field data by inverse quantization, and each restored quaternion value is mapped to a key value format that is formed of rotation axes and a rotation angle. Next, the restored field data of the orientation node is stored. Also, using the restored data, the visual distortion of a quantization error is measured. The distortion might be measured by the following equation 1:

$$D = \sqrt{\frac{\sum_{i=0}^{N-1}(\varepsilon_i)^2}{N}} = \sqrt{\frac{\sum_{i=0}^{N-1}|Q_i - \tilde{Q}_i|^2}{N}} \quad (1)$$

Where, N represents the number of field data, $\varepsilon_i$ represents the difference between a value ($Q_i$) to be encoded at present (i) and a restored value($\tilde{Q}_i$).

Next, the method using the DCPM considers the correlation among successive data and therefore can improve encoding efficiency higher than the method not using the DCPM. The differences between the two methods will now be explained briefly. In the method using the DCPM, the difference value between a previously restored key values and a value to be encoded at present is calculated before quantization, and the difference value is quantized. By doing so, data characteristics occurred in this differentiation improves encoding efficiency, to some degree.

FIG. 1 is a block diagram for explaining the general principle of the DPCM.

A DPCM unit 100 calculates the difference value ($E_i$) between a value ($Q_i$) to be encoded at present and a restored value ($\check{Q}_{i-1}$) using an subtracter 102. The calculated difference value is quantized in a quantizer 120. The quantized value ($\hat{E}_i$) is sent to a destination and an inverse quantizer 140, by which the quantized value ($\hat{E}_i$) is inverse quantized ($\check{E}_i$).

However, in the Orientation Interpolator which interpolates between successive key values by spherical linear interpolation, the DPCM method shown in FIG. 1 cannot have a high efficiency. This can be found when key values which determines the rotational position of an object are analyzed in a quaternion space.

One key value (q) which determines the rotational position of an object on a 3-dimensional space is expressed as a combination of rotation axes and a rotation angle. In the following equations 2, equation (aa) shows how Orientation Interpolator expresses a key value and equation (bb) is an equation for converting the key value into a quaternion.

$$(\vec{r},\theta)=(n_x,n_y,n_z,\theta) \ (0 \leq \theta \leq) \quad \text{(aa)}$$

$$(bb) \ q = \left(\cos\frac{\theta}{2}, \frac{n_x}{\|n\|}\sin\frac{\theta}{2}, \frac{n_y}{\|n\|}\sin\frac{\theta}{2}, \frac{n_z}{\|n\|}\sin\frac{\theta}{2}\right). \quad (2)$$

As shown in equation (bb), if rotation axis vectors and rotation angles of two quaternions have the same absolute values and opposite signs on the quaternion space, the two quaternions are the same. This means that in the physical aspect, two rotational motions are the same and the factors affecting a rotational motion are the rotation axis direction and rotation angle, and not the rotation axis vectors. Therefore, the quaternion expression which represents the rotational motion of an object successfully expresses the rotation axis direction and rotation angle which are factors affecting the rotational motion.

Meanwhile, the DPCM method of FIG. 1, in which equation (aa) is used for calculating time differential value between key values indicating rotation transformations, considers the difference between rotation axis vectors, and therefore does not show correlation of changes in rotation axis directions with respect to time changes and encoding efficiency is lowered.

Meanwhile, since data sets having linear interpolation characteristics have high correlation between successive data, a predictive coding method may be used. In the predictive coding method, current data input is predicted based on neighboring information which is previously encoded and decoded. Then, the information to be encoded at present is encoded by obtaining the differential value between the predicted value and the input value, that is, a prediction error.

In the prior art DPCM method, a differential quaternion calculation will now be explained. First, a differential rotation value between a previously restored value and a value to be encoded at present is calculated. The calculated differential rotation value is quantized and then variable length encoded. At the same time, the quantized differential rotation value is inverse quantized, and multiplied by the previously restored value in a quaternion multiplication. By doing so, a restored value corresponding to the value which is encoded at present is obtained and to be used when a next input signal is encoded. Methods for obtaining a differential quaternion includes a method in which a differential quaternion is obtained by a subtraction between factors of quaternions, each of which is formed of four elements, and a method in which a rotation difference between two quaternions is obtained and used as a differential value. First, the method in which a differential value is obtained by a subtraction uses the following equation:

$$\tilde{Q}=Q-\hat{Q}=(q_0-\hat{q}_0, q_1-\hat{q}_1, q_2-\hat{q}_2, q_3-\hat{q}_3)^T$$

However, according to this method, the characteristic of a quaternion value, that is, the physical meaning indicated by a rotational movement is not shown, so a rotational position error may occur greatly due to an encoding error which occurs in encoding. To solve this problem, a rotation difference may be used as a differential quaternion value. In this case, assuming that a current input value is $Q=(q_0,q_1,q_2,q_3)^T$, and a previously restored value is $\hat{Q}=(\hat{q}_0,\hat{q}_1,\hat{q}_2,\hat{q}_3)^T$, a differential quaternion value is obtained by the following equation:

$$\tilde{Q}=Q(\hat{Q}^*)$$

As this, in performing orientation interpolator node encoding, when higher correlation between successive quaternion values is considered, the method in which quantization and variable length encoding are performed after obtaining a differential quaternion value corresponding to input rotational information by using a previously restored value can compact the distribution of differential quaternion values if a value can be predicted by an appropriate prediction method. Therefore, this method improves information compression efficiency by improving the efficiency of quantization and variable length encoding.

SUMMARY OF THE INVENTION

To solve the above problems, it is a first objective of the present invention to provide a encoding/decoding apparatus and method for an orientation interpolator node, in which by encoding the field data of an orientation interpolator node through an adaptive DPCM processing using a differential rotation value, data redundancy in the time domain is removed, bit redundancy between symbols, which are quantized through additional arithmetic encoding, is removed, and additional information for elements is removed, with reflecting the physical characteristics of a rotational and translational movement in a quaternion space, so that the efficiency of data transmission is improved and the degree of visual quality distortion is more objectively measured.

It is a second objective of the present invention to provide an encoding/decoding apparatus and method for an orientation interpolator node, in which in obtaining a differential quaternion value using an improved prediction method, the distribution is compacted and the efficiency of the compression processing is improved.

It is a third objective of the present invention to provide an encoding/decoding apparatus and method for correcting a rotation in an inverse direction of the original rotational information because of distortion of the original rotation information by an encoding error which inevitably occurs in all lossy encoding process, including a predictive coding, when an object is rotated based on decoded rotational information in a receiving side.

To accomplish the first objective of the present invention, there is provided an encoding/decoding apparatus for an orientation interpolator node data which provides rotational information of an object in a 3-dimensional space, the encoding/decoding apparatus having a differential modulation processing unit for performing differential pulse code modulation (DPCM) by converting key value of data having a key and key values into a quaternion form; a quantizing is unit for quantizing the DPCM processed key value data and outputting the quantized key value data; a variable length encoding unit for variable length encoding the quantized differential key value data; an inverse quantizing unit for inverse quantizing the quantized differential key value data and outputting the inverse quantized differential key value data; a quaternion multiplication unit for performing quaternion multiplication of the inverse quantized differential key value data and multiplying the result of a previously decoded key value;

a delay unit for delaying the output of the quaternion multiplication unit; and a predicting unit having a prediction order control function which receives the output of the delay, predicts an input value to be encoded next, and can adjust the prediction order.

BRIEF DESCRIPTION OF THE DRAWINGS

The above objects and advantages of the present invention will become more apparent by describing in detail preferred embodiments thereof with reference to the attached drawings in which:

FIGS. 2 through 7 are diagrams for explaining a first preferred embodiment of the present invention.

DESCRIPTION OF THE PREFERRED EMBODIMENTS

The present invention relates to an encoding/decoding apparatus and method which can improve the efficiency of data transmission by reducing redundancy of key values using a quaternion representation method and data characteristics of an orientation interpolator node for providing rotational information of an object. Also, an error measuring method which can objectively measure the degree of visual distortion caused by an error occurring in compressing data is provided.

Figure 1:
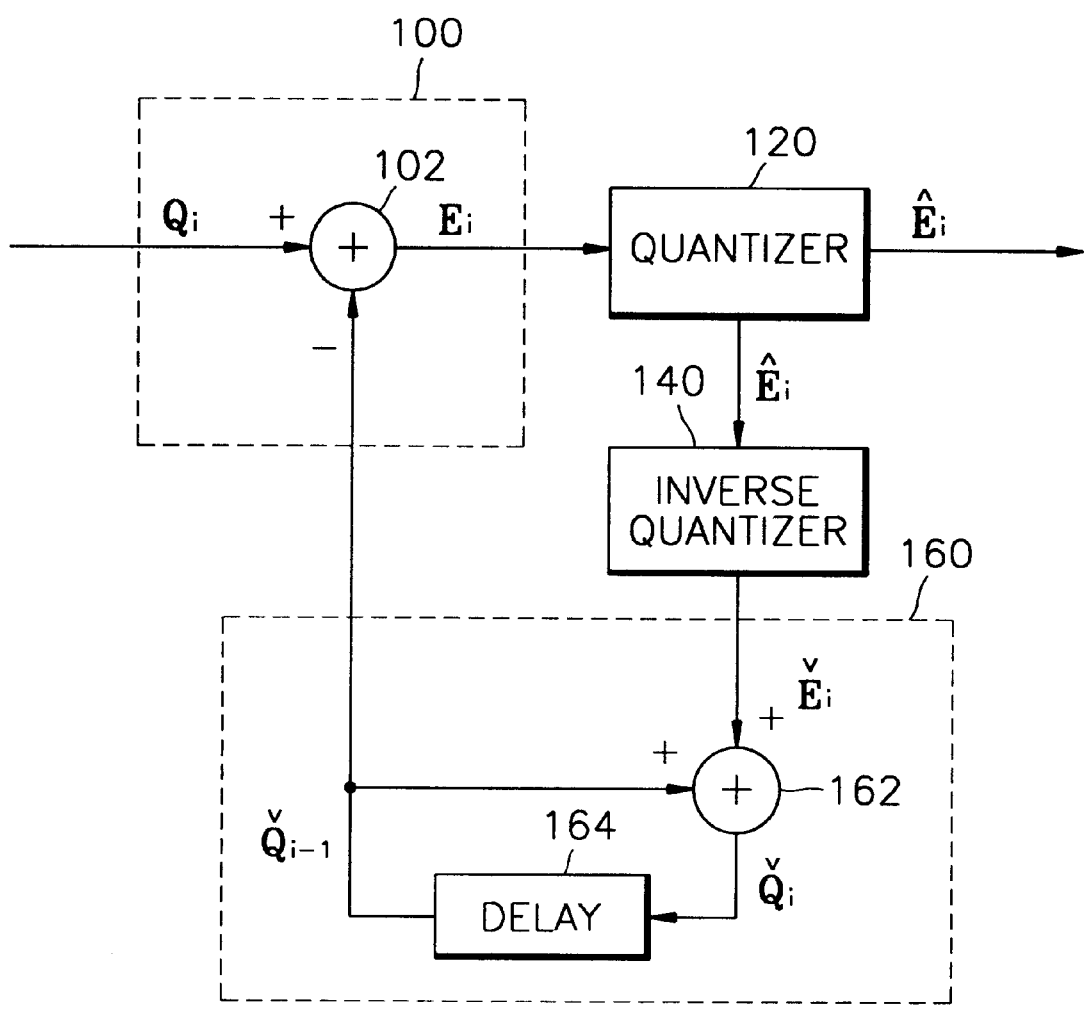
FIG. 1 is a block diagram for explaining the differential pulse code modulation (DPCM)
Figure 2:
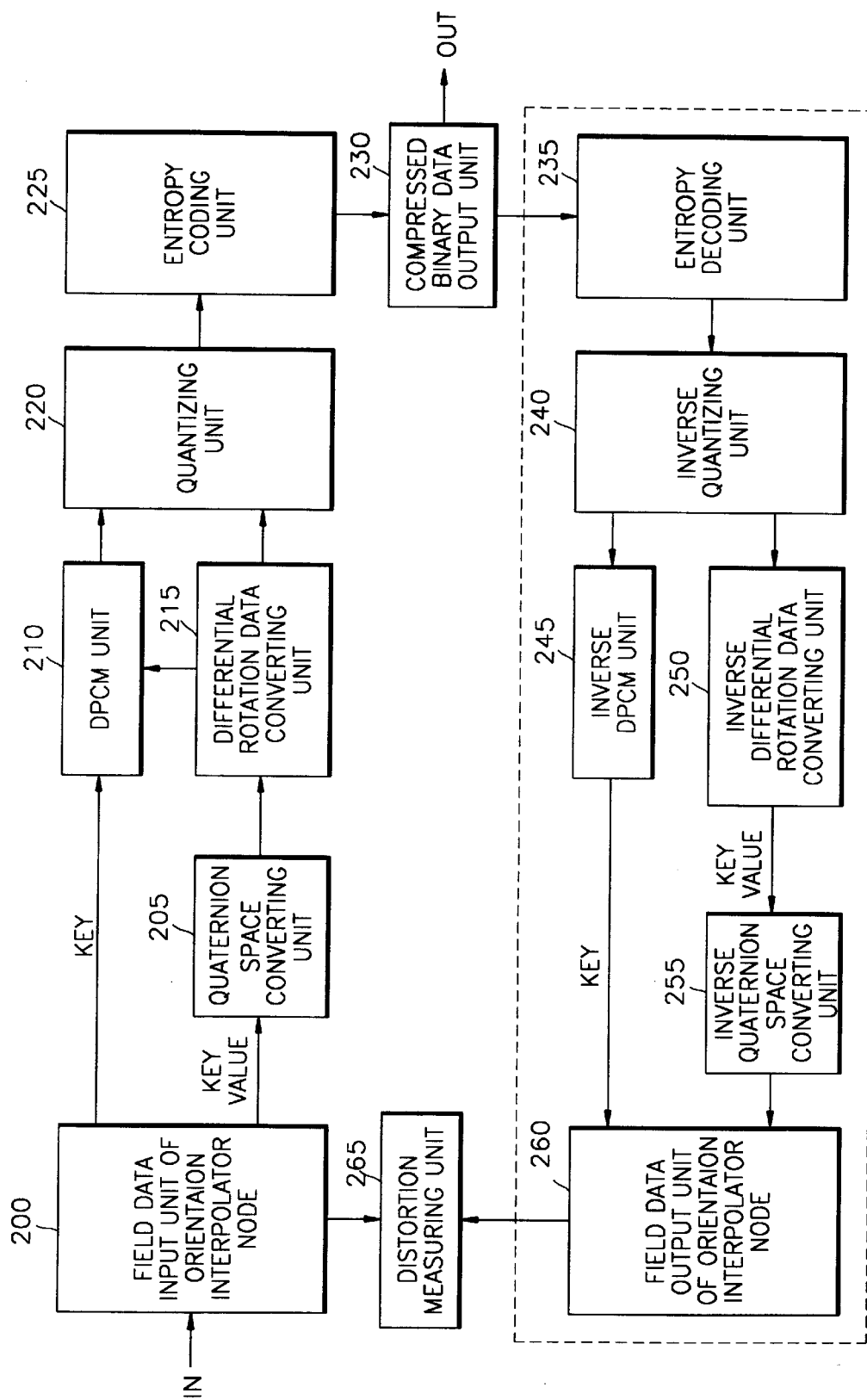

FIG. 2 is a schematic block diagram of an encoding/decoding apparatus of an orientation interpolator node according to a first preferred embodiment of the present invention.

The encoding/decoding apparatus according to the present invention includes a field data input unit of an orientation interpolator node 200, an adaptive DPCM processing unit for field data, a quantizing unit 220, a compressed binary field data output unit 230, and additionally an entropy encoding unit 225. Here, the adaptive DPCM processing unit includes a quaternion space converting unit 205, a DPCM unit 210, and a differential rotation data converting unit 215. The encoding apparatus also includes a decoding unit so as to check the decoding result of output data on a receiver and measure the degree of visual distortion of a overall processing error. The decoding unit includes an entropy decoding unit 235, an inverse quantizing unit 240, an inverse DPCM unit 245, an inverse differential rotation data converting unit 250, an inverse quaternion converting unit 255, a field data output unit of a restored orientation interpolator node 260, and a distortion measuring unit 265.

FIG. 5 is a flowchart for explaining an encoding method of an orientation interpolator node according a first preferred embodiment of the present invention. Referring to FIGS. 2 and 5, the operation of the encoding apparatus of the present invention will now be explained.

First, field data of an orientation interpolator node to be encoded is applied in step 500, in FIG. 5. More specifically, the field data input unit 200 parses an orientation interpolator node in input VRML data, and extracts field data which is formed with a key and key values. The key indicates information on a position on a time domain at which a change of a rotational and translational movement occurs. The key values indicates rotational information.

Next, key value data is converted into a quaternion form, and then Adaptive-DPCM (ADPCM) processing is performed according to a differential rotation data converting equation. And, DPCM processing of key data is performed in step 510, in FIG. 5. More specifically, redundancy among successive data of key value data ($KV_i$, $0 \leq i \leq N-1$) which is extracted in the field data input unit 200 is removed and the precision of data representation is adjusted. In particular, in the present invention, key value data is sent to the quaternion converting unit 205 before ADPCM processing. The quaternion converting unit 205 converts key value data, that is, rotational information, into a quaternion form represented by one real number (a rotation angle) and three imaginary numbers (rotation axes). Next, the differential rotation data converting unit 215 calculates differential rotation data between the current key value and the previous key value input from the quaternion converting unit 205.

In the prior art DPCM of key value data, in calculating a rotational movement from a current position p of an object to a position q of the object after a rotational movement, the value of the rotational movement is defined by the difference value between each element formed of rotation axes and a rotation angle. When only the difference value is considered as this, redundancy of data to be encoded is lowered, and physical characteristics of the movement of the object cannot be expressed. Therefore, it is difficult to measure visual effects on an encoding error. Also, from the aspect of data restoration, in order to express an element having the greatest value in each component of key value, 2 bits information is additionally transmitted from an encoding apparatus to a decoding apparatus as shown in FIG. 7a.

Figure 3:
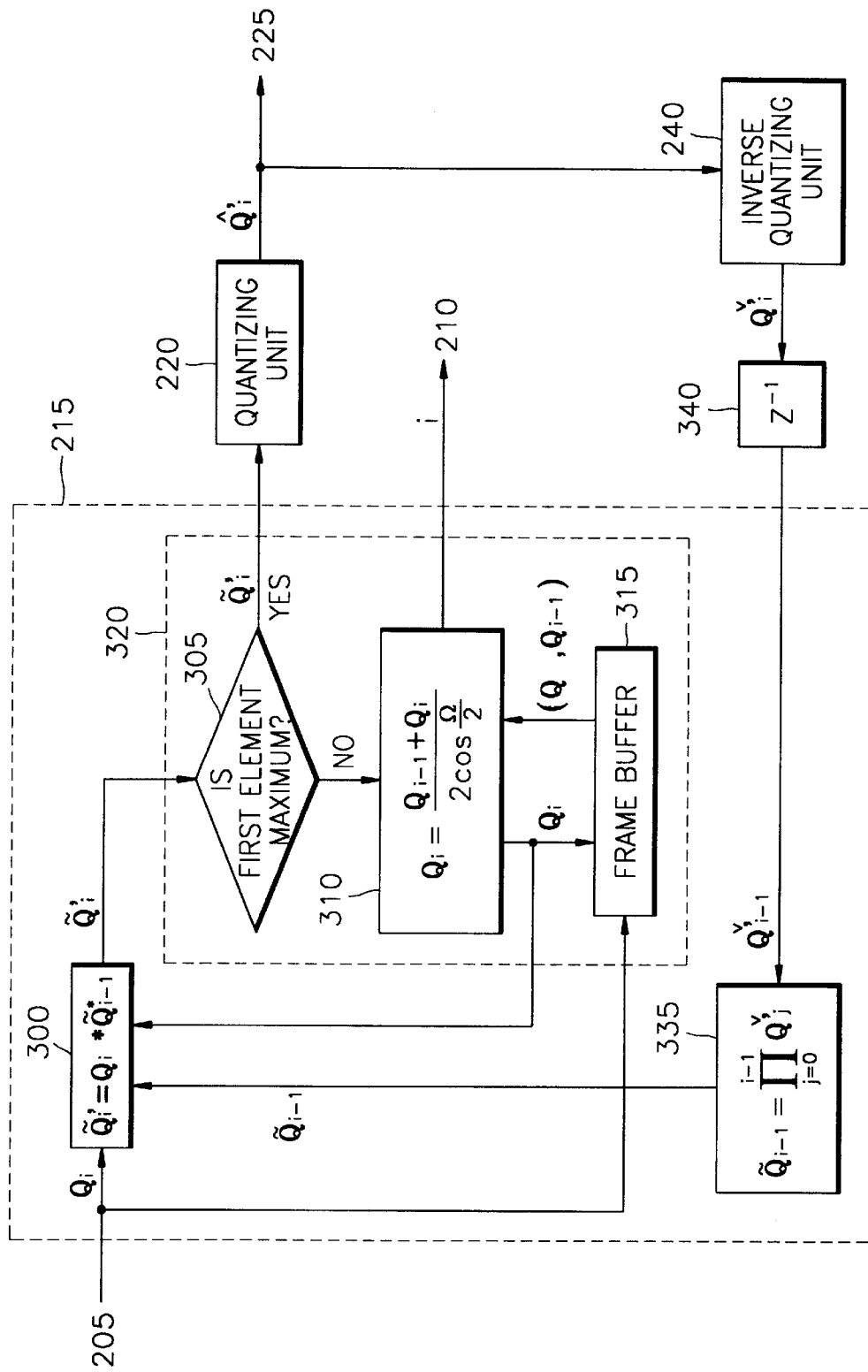

Therefore, in the present invention, in order to encode a rotational movement between successive key values of orientation interpolator nodes, a processing method that is different from the prior art DPCM is implemented through the differential rotation data converting unit 215. Based on the fact that the rotation of an object in a quaternion space is formed with a combination of rotation axes and a rotation angle, the differential rotation data converting unit 215 is constructed, for example, as shown in FIG. 3, so that the rotational movement with respect to a real rotational movement path can also be defined by a differential rotation data converting equation using rotation axes and a rotation angle.

The principle of the differential rotation data converting equation used in the differential rotation data converting unit 215 will now be explained.

Assuming that $\vec{x}$ denotes the current position vector of an object, ($\vec{n}_{i-1}$, $\theta_{i-1}$) denotes key values at key=$k_{i-1}$, and $\vec{y}_{i-1}$ denotes a displacement vector of $\vec{x}$ in rotational movement of the object, a rotational movement equation in a quaternion space is expressed as the following equation 3:

$$Y_{i-1} = Q_{i-1} * X * Q^*_{i-1} \tag{3}$$

Where, X, $Q_{i-1}$, and $Y_{i-1}$ are quaternion expressions of $\vec{x}$, ($\vec{n}_{i-1}$, $\theta_{i-1}$) and $\vec{y}_{i-1}$, respectively.

In the same manner, when key=$k_i$, the rotational movement equation in a quaternion space is expressed as the following equation 4:

$$Y_i = Q_i * X * Q^*_i \tag{4}$$

From equations 3 and 4, a equation for obtaining a differential rotation value is derived as the following equation 5:

$$Y_i = Q_i * X * Q^*_i = Q_i * Q_{i-1} * Y_{i-1} * Q_{i-1} * Q_i = Q'_i * Y_{i-1} * Q'^*_i \tag{5}$$

Therefore, a quaternion differential rotation data converting equation representing a differential rotation data is defined as the following equation 6:

$$Q'_i = Q_i * Q^*_{i-1} \tag{6}$$

Referring to FIG. 3 based on these equations, the differential rotation data converting unit 215 includes a differential rotation data calculation unit 300, an element adjusting unit 320, an accumulating unit 335, and a delay unit 340. The differential rotation data calculation unit 300 receives key value data which is converted into a quaternion form and to be encoded at present, and defines a differential rotation data to be encoded at present as equation 6. The element adjusting unit 320 redefines the differential rotation data to be encoded at present so that a condition that in the differential rotation data(that is, rotation angles and rotation axes), which is formed of four elements (v[0], v[1], v[2], v[4]), the value of a first element (v[0]=cos ($\theta/2$), Here, $\theta$ denotes a rotation angle) is always greater than any value of the remaining three elements is satisfied. In response to the output of the differential rotation data converting unit 215, the delay unit 340 stores differential rotation data which are restored at present, and provides differential rotation data which were restored before. The accumulating unit 335 accumulates differential rotation data restored before by sequentially receiving previous differential rotation data from the delay unit 340, and outputs the result to the differential rotation data converting unit 300.

Figure 4:
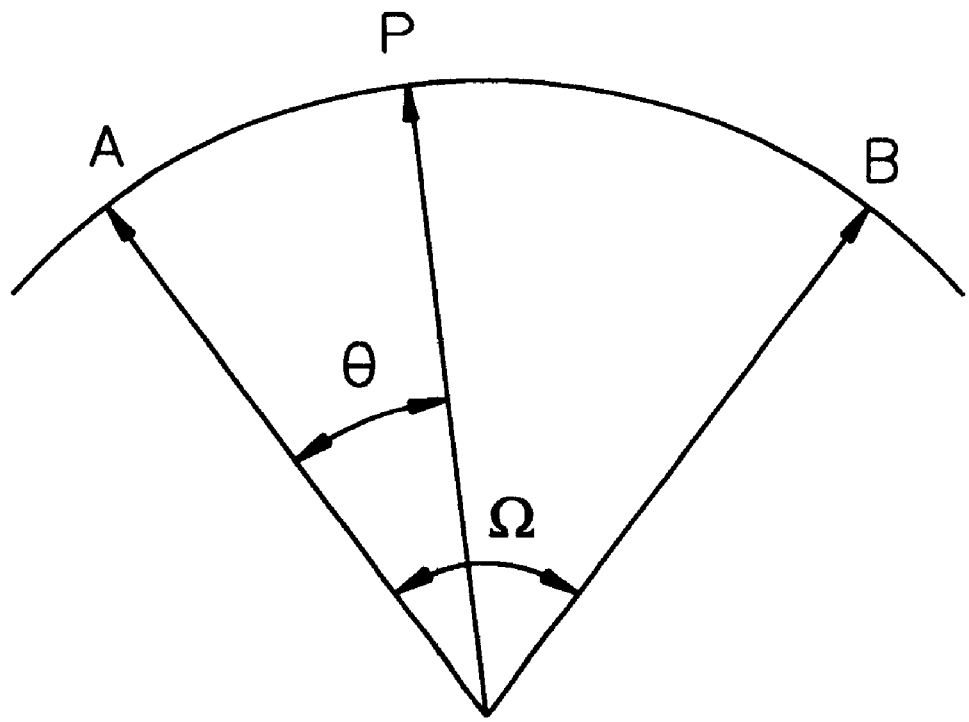

The element adjusting unit 320 uses the principle shown in FIG. 4 so that a condition that among four elements (v[0], v[1], v[2], v[3]) forming rotational information the value of the first element is always greater than any value of the remaining three elements is satisfied. That is, when an object moves from position A to position B and rotates Q degrees in FIG. 4, if the first element among elements of a differential rotation data of this rotational movement does not satisfy the above-mentioned condition, a method of redefining a differential rotation data is used, the method in which position P ($0<\theta<\Omega$) which is obtained when the object rotates $\theta$ degrees along a shortest movement path is arbitrarily defined so that the above-mentioned condition is satisfied.

Here, a method of comparing sizes of magnitude of difference of two quaternion is used as a method for selecting a shortest movement path that occurs in a rotational movement of the object. For example, rotational movement information on two arcs through which quaternion A of a starting position moves and rotates to quaternion B of the position after a rotational movement includes quaternion B and quaternion −B. At this time, A quaternion which produces the smallest value between the magnitude of difference from quaternion A to quaternion B and the magnitude of difference from quaternion A to quaternion −B is selected as one (in example, B) which has a shortest movement path. Therefore, an equation of a differential rotation data satisfying this shortest movement path is defined as the following equations 7:

$$|A|=|B|=|P|=1$$
$$A \cdot B = \cos\Omega$$
$$P = A\frac{\sin(\Omega - \theta)}{\sin\Omega} + B\frac{\sin\theta}{\sin\Omega} \qquad (7)$$

In addition, if the position of point P is defined as a position which is in the middle of positions A and B ($\theta = \Omega/2$), an equation of a differential rotation data is derived as the following equation 8:

$$P = \frac{A + B}{2\cos\frac{\Omega}{2}} \qquad (8)$$

Therefore, if the first component ($q_0$) of the quaternion $Q(q_0,q_1,q_2,q_3)$ which is input from the differential rotation data converting unit 300 to the condition 305 is not the largest one among the four components, the key value generating unit 310 in the element adjusting unit 320 defines new key values from the previous key value and the current key value, that is, rotational information, so that the first element satisfies the condition 305 according to equation 8. At this time, the additionally defined rotational information is stored in a buffer 315 and at the same time output to the differential rotation data converting unit 300. The buffer 315 stores key value data which is to be encoded at present. The buffer 315 sequentially stores key value data generated in the key value generating unit 310 and provides current and previous rotational information. Also, the buffer 315 provides θ, Ω, and a corresponding key value index to DPCM unit 210 in order to generate a key according to the generation of key values by θ. A key generation equation in the DPCM unit 210 is as the following equation 9:

$$K_i = K_{i-1} + (K_i + K_{i-1}) * \frac{\theta}{\Omega} \qquad (9)$$

Key data ($k_i$, $0 \leq i \leq N-1$) which is extracted in the field data input unit 200 is applied to the DPCM unit 210. DPCM unit 210 generates an additional key also by the differential rotation data converting unit 215. The DPCM unit 210 outputs first key data ($k_0$) without change, and outputs the remaining key data by calculating the difference value ($dk_i$) between the key ($k_{i-1}$) which was previously restored and the key ($k_i$) which is to be encoded at present. The DPCM unit 210 removes redundancy among successive data and adjusts precision of data representation so that a compression process is performed.

As described above, by adjusting a first element value of a quaternion in the element adjusting unit 320 so that the first element value has the greatest value, 2 bit additional information, that is, information indicating which element is the greatest among four elements, of only the initial key values is transmitted is to the decoding apparatus. In the prior arts, 2 bit additional information about all key values is transmitted to the decoding apparatus. Therefore, the prior art syntax shown in FIG. 7a can be changed to an improved syntax according to the present invention shown in FIG. 7b. Accordingly, when N key value data are actually encoded, generated bits in the present invention are reduced by 2(N−1) bits compared to the generated bits in the prior arts due to additional information.

Referring to FIG. 5 again, after step 510 key and key value data which are ADPCM processed are quantized in step 520. In order to remove bit redundancy in quantized values, quantized key and key value data are arithmetic encoded and output as binary format stream data in step 530.

An important factor in effectively reducing the amount of data to be actually encoded is removal of bit redundancy. That is, quantized bits have redundancy and known methods for removing this redundancy include a Variable Length Coding (VLC) method, and a Huffman coding method using a symbol pattern. In the present invention, an arithmetic coding method, in which bit redundancy is removed by calculating the frequency of symbol by using conditional probabilities, is used. The entropy encoding unit 225 of FIG. 2 performs this method and the binary data output unit 230 for outputting compressed binary data outputs encoded data as binary format stream data.

Here, architecture of the structure of stream data with respect to types and functions of streaming services is considered in this streaming step. FIGS. 6a and 6b show two types of stream data structures. FIG. 6a shows a data structure which is provided when the real-time characteristic of services is not considered and has the simplest structure. In this structure, delay occurs for the same time period as the time period in which key data is restored. Compared to the structure of FIG. 6b, the structure of FIG. 6a has a higher processing cost of the encoding apparatus and a lower processing cost of the decoding apparatus. The structure of FIG. 6b provides the real-time characteristic and additional functionality of data services. In this structure, immediately after a key and corresponding key values are restored, visualization is enabled. Also, one of important functionality is error resistance. That is, though current data has a loss, the loss can be restored to some degree with previous data and next data to be restored. To provide data structures shown in FIGS. 6a and 6b, data to be encoded is encoded in order of 200→205→215→210→220→225 of FIG. 2. In the unit 225, an arithmetic encoding is performed in keys and key values, According to the data structure of FIGS. 6a and 6b, the order of keys and key values to be encoded is different.

Referring FIG. 5 again, after step 530, the encoded output data is restored in the reverse process of the encoding process described above. With respect to the restoration result, visual distortion for evaluating the performance of the encoding/decoding apparatus is measured in step 540. When encoded output data is restored, the distortion measuring unit 265 measures visual quality with respect to the original information before encoding. For this, the decoding unit is formed as 235 through 260 of FIG. 2 and the process performed in the decoding unit is the inverse of the encoding process.

The performance of the encoding/decoding apparatus is measured by a characteristic value, that is, visual quality. In the prior art encoding methods, to measure the performance of an encoding/decoding apparatus, a characteristic value is used, for example, using equation 1. However, in this method, a quantization error for each element for rotation is calculated, so the characteristics of a quaternion space cannot be shown and visual distortion of a real rotation movement cannot be expressed objectively. Therefore, the encoding apparatus according to the present invention additionally includes an improved distortion measuring unit 265 which satisfies the characteristics of a quaternion space and is capable of objectively measuring visual distortion. The distortion measuring unit 265 measures encoding errors, regarding all points on the surface of an object as all points on a unit spherical surface. The basic principle of the measuring will now be explained.

A encoding error is defined as a difference value of two rotational transformations. That is, assuming that $(\vec{r},\theta)$ denotes key values of an orientation interpolator node and $(\vec{r}',\theta')$ denotes key values obtained by restoring the key values through the decoding unit ($\vec{r}$ denotes a rotation axis, $\theta$ denotes a rotation angle, and the rotation angle satisfies $\theta \in [-\pi,\pi]$), $\vec{x}$ is an arbitrary position vector on a unit spherical surface and satisfies $S=\{\vec{x} \| \vec{x}\|=1\}$. When a rotational transformation from $\vec{x}$ to $\vec{y}$ and $\vec{y}'$ by $(\vec{r},\theta)$ and $(\vec{r}',\theta')$ is performed, a encoding error occurring is calculated as the difference between $\vec{y}$ and $\vec{y}'$. A encoding error vector $\vec{e}(\vec{x})$ satisfies $\vec{e}(\vec{x})=\vec{y}-\vec{y}'$. When encoding error vectors $\vec{e}(\vec{x})$ of all points on a unit spherical surface are calculated using this equation, RMS error($D_m$) for all the spherical surface and a maximum error ($D_p$) are calculated by the following equations 10:

$$\begin{cases} D_m \equiv \sqrt{\underset{\vec{x} \in S}{E}\left[\|\vec{e}(\vec{x})\|^2\right]} \\ D_p \equiv \max_{\vec{x} \in S} \sqrt{\|\vec{e}(\vec{x})\|^2} \end{cases} \quad (10)$$

Meanwhile, the relation between $\vec{y}$ and $\vec{y}'$ can be expressed in a rotational transformation equation as the following equation 11:

$$\vec{y}'=T_{\vec{r}',\theta'}(\vec{y}) \quad (11)$$

A encoding error vector derived from these equations is defined as the following equations 12:

$$\|\vec{e}(\vec{x})\| = 2\cos\varphi \sin\frac{\theta''}{2}$$

where $\vec{x}=(1,\phi,\varphi)$, $\phi$=azimuth angle, $\phi \in [-\pi,\pi]$, $$\varphi = \text{longitude angle}, \varphi \in \left[-\frac{\pi}{2}, \frac{\pi}{2}\right] \quad (12)$$

RMS error($D_m$) and a maximum error ($D_p$) which are newly derived according to equations 10 and 12 are defined as the following equation 13:

$$D_m = \sqrt{\frac{1}{4\pi}\int_S \|\vec{e}(\vec{x})\|^2 ds} \quad (13)$$

$$= \sqrt{\frac{1}{4\pi}\int_{\varphi=-\frac{\pi}{2}}^{\varphi=\frac{\pi}{2}}\int_{\phi=-\pi}^{\phi=\pi}\left(2\cos\varphi\sin\frac{|\theta''|}{2}\right)^2 \cos\varphi d\phi d\varphi}$$

$$= \sqrt{\frac{1}{4\pi}8\pi\sin^2\frac{|\theta''|}{2}\int_{\varphi=-\frac{\pi}{2}}^{\varphi=\frac{\pi}{2}}\cos^3\varphi d\varphi}$$

$$= \sqrt{2\sin^2\frac{|\theta''|}{2}\int_{\varphi=-\frac{\pi}{2}}^{\varphi=\frac{\pi}{2}}\cos^3\varphi d\varphi}$$

$$= \sqrt{2}\sin^2\frac{|\theta''|}{2}\sqrt{\int_{\varphi=-\frac{\pi}{2}}^{\varphi=\frac{\pi}{2}}\cos^3\varphi d\varphi}$$

$$= \sqrt{2}\sin^2\frac{|\theta''|}{2}\sqrt{\left(\left[\frac{2+\cos^2\varphi}{3}\sin\varphi\right]\right)_{\varphi=-\frac{\pi}{2}}^{\varphi=\frac{\pi}{2}}}$$

$$= \sqrt{2}\sin\frac{|\theta''|}{2}\sqrt{\frac{2}{3}-\frac{2}{3}(-1)}$$

$$= \sqrt{2}\sin\frac{|\theta''|}{2}\sqrt{\frac{4}{3}} = \sqrt{\frac{8}{3}}\sin\frac{|\theta''|}{2}$$

$$\begin{cases} D_m = \sqrt{\frac{8}{3}}\sin\frac{|\theta''|}{2} \left(\text{cf. mean error} = \frac{\pi}{2}\sin\frac{|\theta''|}{2}\right) \\ D_p = 2\sin\frac{|\theta''|}{2} \end{cases}$$

Meanwhile, $\vec{x}, \vec{y}$, and $\vec{y}'$ are defined in a quaternion space as:

$$\begin{cases} X = (0, \vec{x}) \\ Y = (0, \vec{y}) \\ Y' = (0, \vec{y}') \end{cases}$$

If $(\vec{r}, \theta)$ and $(\vec{r}', \theta')$ which represent a rotational transformation are expressed in a quaternion space and referred to as Q and Q', respectively, equations, $Y=Q*X*Q^*$ and $X=Q'^**Y*Q'$, can be derived. Here, $A*B$ indicates quaternion multiplication and A denotes As conjugate. From these equations, the following equation is derived:

$$Y'=Q'*X*Q'^* = Q'*Q^**Y*Q*Q'^* = Q''*Y*Q''^*$$

Q'' is a value for indicating the rotational transformation relation between $\vec{y}$ and $\vec{y}'$, and is defined as the following equation 14:

$$Q''=Q'*Q^* \quad (14)$$

Therefore, using equations 13 and 14, RMS error ($D_m$) of a encoding error for all unit spherical surface and the maximum error ($D_p$) are defined as the following equations 15 or equations 16:

$\theta''=2\cos^{-1}q_0''=2\cos^{-1}(Q'\cdot Q)$, $\theta'' \in [0,\pi]$, $q_0''=Q'\cdot Q$, (·indicates inner product operation)

$$\begin{cases} D_m = \sqrt{\frac{8}{3}}\sin\frac{|\theta''|}{2} = \sqrt{\frac{8}{3}}\sin\{|\cos^{-1}(Q'\cdot Q)|\} \\ D_p = 2\sin\frac{|\theta''|}{2} = 2\sin\{|\cos^{-1}(Q'\cdot Q)|\} \end{cases} \quad (15)$$

$$\begin{cases} D_m = \sqrt{\dfrac{8\{1-(Q'\cdot Q)^2\}}{3}} \\ D_p = \sqrt{4\{1-(Q'\cdot Q)^2\}} \end{cases} \quad (16)$$

Equations 15 and 16 reflects physical characteristics of rotational movement of an object on a quaternion space and therefore provides measured values more objective than that of equation 1. Therefore, in the present invention, the distortion measuring unit 265 is formed so as to use equation 15 or 16. Accordingly, the present invention is characterized in that it can correctly measure visual distortion due to a encoding error more objectively than the prior art methods.

Figure 8:
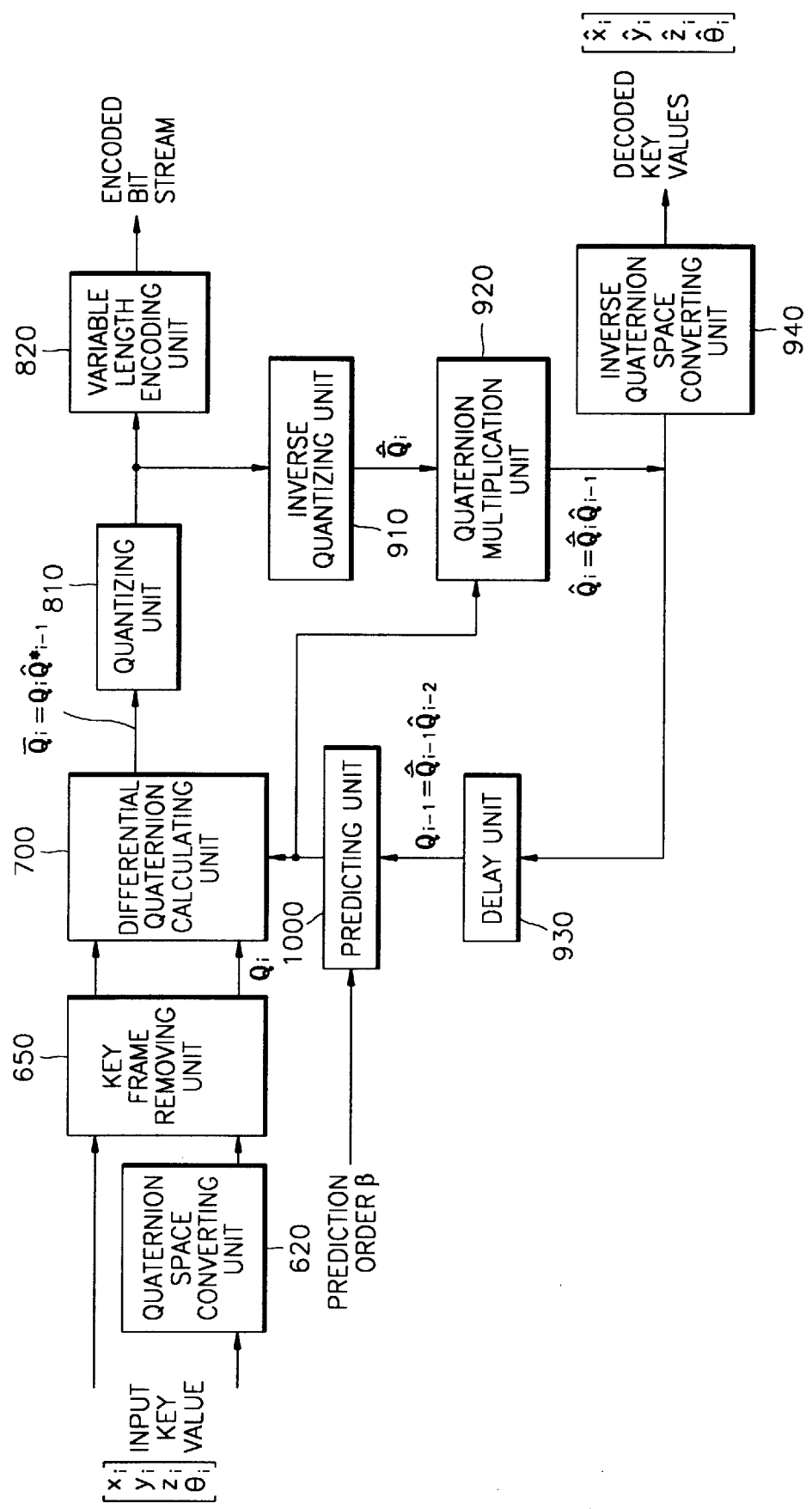
FIGS. 8 through 21 are diagrams for explaining a second preferred embodiment of the present invention.

FIG. 8 is a schematic block diagram of an encoding/decoding apparatus for an orientation interpolator node according to a second preferred embodiment of the present invention.

Referring to FIG. 8, the encoding/decoding apparatus includes a quaternion converting unit 620, a key frame removing unit 650, a differential quaternion calculating unit 700, and a quantizing unit 810.

The quaternion converting unit 620 converts key values of input field data into quaternion space information. The key frame removing unit 650 removes a key frame within an allowable error limit, using similarity in a rotational transformation data. The differential quaternion calculating unit 700 generates a DPCM value by obtaining a differential rotational quaternion value. The quantizing unit 810 quantizes the differential value.

In addition, the encoding apparatus further includes a predicting unit 1000 which predicts currently input data using previously restored data. The predicting unit 10000 reduces the differential value so that the efficiency of compression of information by the quantizing unit 810 and the variable length encoding unit 820 is improved. In particular, the predicting unit 1000 of the present embodiment can change the order of prediction and adjust prediction performance by using prediction order control value β, Also, the encoding apparatus further includes a rotation direction correction unit which adds a rotation direction correction function to each of the predicting unit 1000 and the differential quaternion calculating unit 700 so as to remove a rotation direction error which occurs due to an encoding error. This function will be explained later.

The encoding/decoding apparatus according to the present embodiment performs compression of information by processing input rotational information on a quaternion space. More specifically, rotational information which is input is expressed by a 4-dimensional vector as the following equation 17:

$$\text{rotational information} = (x_i, y_i, z_i, \theta_i)^T \quad (17)$$

Where, subscript i denotes i-th input, $(x_i, y_i, z_i)^T$ denotes a rotation axis vector when an object is rotated, and $\theta_i$ denotes an angle by which the object rotates counterclockwise about the rotation axis. Superscript T denotes transposition for expressing a row vector as a column vector. Before encoding, the quaternion converting unit 620 converts rotational information which is expressed in a rectangular coordinate form into quaternion format. The principle of converting a rotational information in a rectangular coordinate system into a quaternion coordinate system is as the following equation 18:

$$Q_i = (q_{i,0}, q_{i,1}, q_{i,2}, q_{i,3})^T = \left(\cos\frac{\theta_i}{2}, x_i\sin\frac{\theta_i}{2}, y_i\sin\frac{\theta_i}{2}, z_i\sin\frac{\theta_i}{2}\right)^T \quad (18)$$

However, in order to actually convert data which expressed as equation 18, some processing steps are additionally needed.

Figure 9:
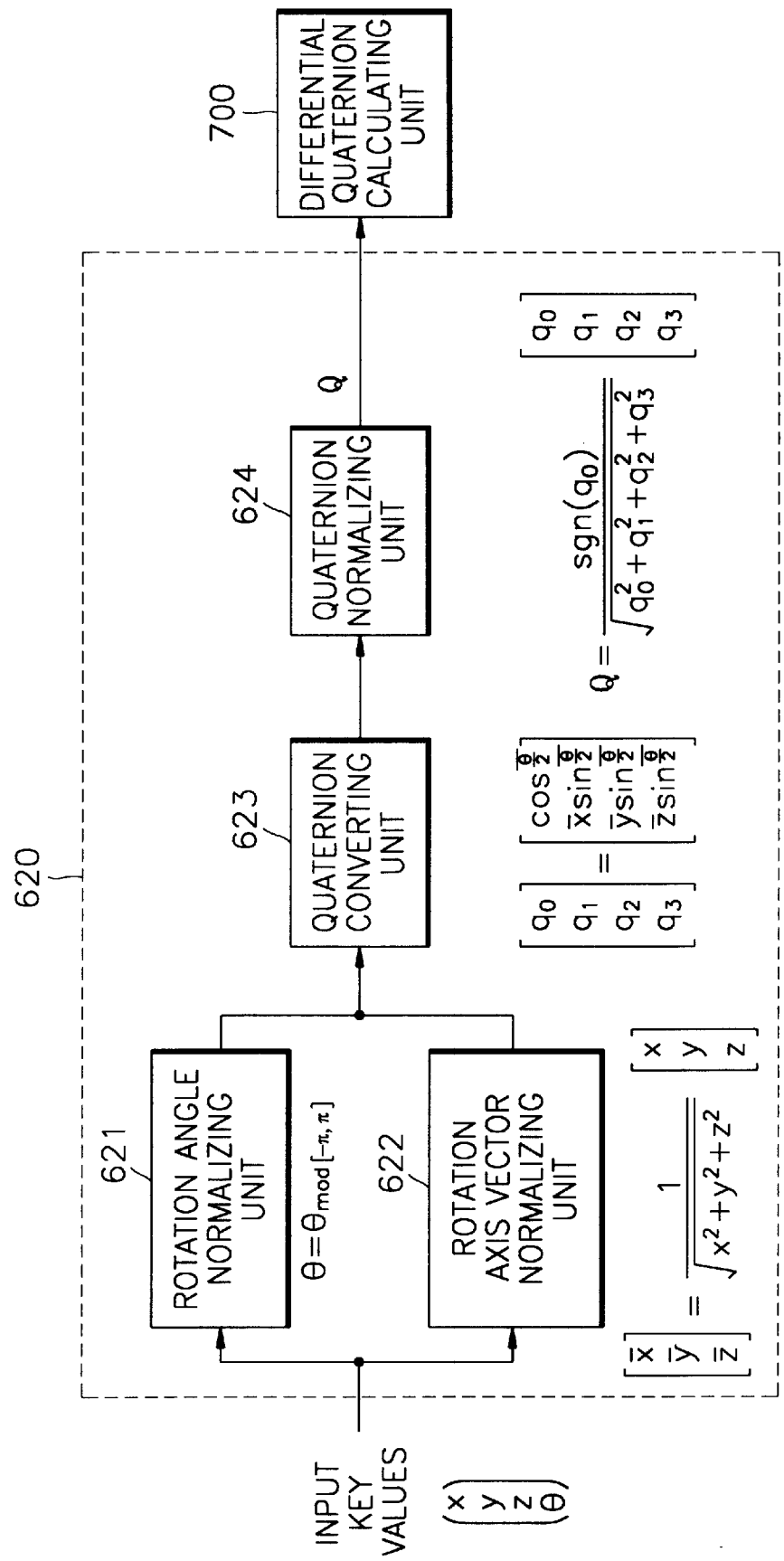

FIG. 9 is a block diagram for explaining an example of the quaternion converting unit 620.

Referring to FIG. 9, the quaternion converting unit 620 includes a rotation angle normalizing unit 621, a rotation axis vector normalizing unit 622, a quaternion space converting unit 623, and a quaternion normalizing unit 624.

The rotation angle normalizing unit 621 normalizes a rotation angle of input key value information, and the rotation vector normalizing unit 622 normalizes a rotation axis vector. This is to remove in advance an error which may be included in input information. More specifically, the rotation angle normalizing unit 621 normalizes rotation angle information which is input, as the following equation 19:

$$\theta = \theta_{mod[-\pi,\pi]} \quad (19)$$

That is, the rotation angle normalizing process is to convert rotation angle information into a value between [−π,π]. By doing so, the rotation angle information is maintained while the processing process thereafter is simplified. The rotation axis vector normalizing unit 622 is processed as the following equation 20:

$$(x_i, y_i, z_i)^T = \frac{1}{\sqrt{x_i^2 + y_i^2 + z_i^2}} (x_i, y_i, z_i)^T \quad (20)$$

That is, the rotation vector normalizing process is to make a rotation axis vector a unit vector. The rotational information of which rotation angle and rotation axis vector are normalized as described above is converted into a quaternion space by equation 18. Then, the converted quaternion information is expressed as a quaternion value having a unit size by the quaternion normalizing unit 624. The operation of the quaternion normalizing unit is as the following equation 21:

$$Q = \frac{sgn(q_0)}{\sqrt{q_0^2 + q_1^2 + q_2^2 + q_3^2}} (q_0, q_1, q_2, q_3)^T \quad (21)$$

Next, the differential quaternion calculating unit 700 obtains a differential quaternion value between input rotational information, which is expressed in a quaternion value, and a quaternion value which is previously encoded and decoded. The equation for obtaining a differential quaternion value is $\tilde{Q}=Q-\hat{Q}=(q_0-\hat{q}_0, q_1-\hat{q}_1, q_2-\hat{q}_2, q_3-\hat{q}_3)^T$ or $\tilde{Q}=Q(\hat{Q})^*$ as described above. In the present embodiment, the latter equation is used for obtaining a differential quaternion value.

Referring to FIG. 8 again, the quantizing unit 810 quantizes the differential quaternion value and the variable length encoding unit 820 variable length encodes the quantized value. In the present embodiment, the variable length encoding unit 820 uses an adaptive arithmetic encoder which is generally used.

The inverse quantizing unit 910 inverse quantizes the quantized differential quaternion value. The inverse quantized value is used to generate a decoded value which is used in encoding a next input quaternion value. By quaternion multiplying the output of the quaternion multiplication unit 820 by the output of the inverse quantizing unit 910, and then delaying the result of the quaternion multiplication in the delay unit 930, the decoded value is obtained.

The operation of the quaternion multiplication unit 920 is expressed as the following equation 22:

$$\hat{Q}_i \leftarrow \hat{Q}_i \hat{Q}_{i-1} \qquad (22)$$

$$\hat{Q}_i = \hat{Q}_i \hat{Q}_{i-1} \qquad (22)$$

Here, $Q_{1-1}$ denotes a previously decoded value which is provided to the quaternion multiplication unit 920 thorugh the delay unit 930, and $\hat{Q}_i$ is the output value of the inverse quantizing unit 910 which is provided to the quaternion multiplication unit 920. The output of the quaternion multiplicatin unit 920 is a decoded quaternion value. Here, the decoded quaternion value may be output as a rotational information value which is decoded.

The predicting unit 1000 improves the efficiency of encoding. That is, in the process in which the differential quaternion calculating unit 700 receives the output of the delay unit 930 and obtains a differential quaternion, the predicting unit 1000 compacts the distribution of differential quaternion values so that the compression efficiency of information in the quantizing unit 810 and the variable length encoding unit 820 is improved. Also, the predicting unit of the present embodiment provides a function for controlling prediction order.

Figure 10:
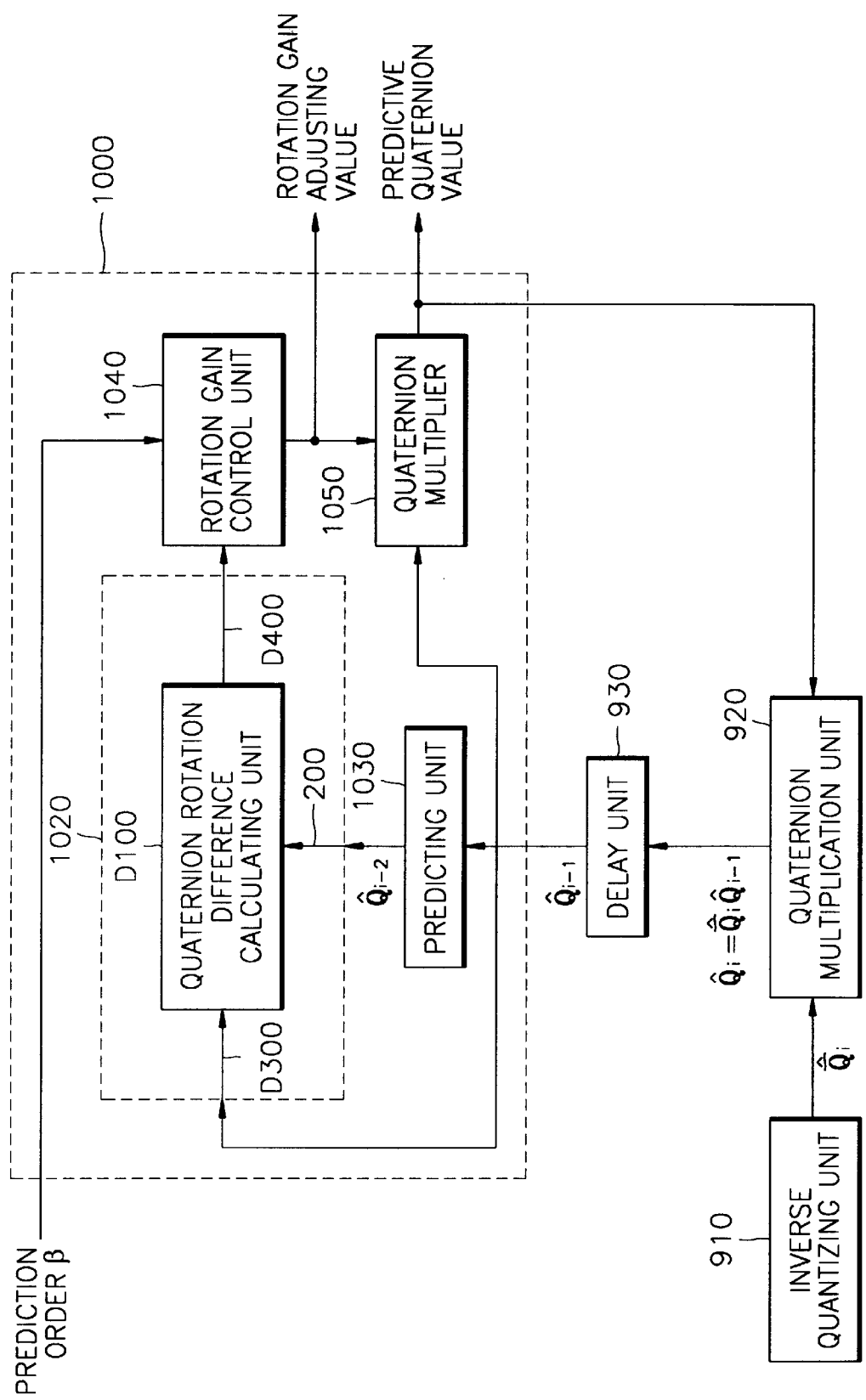
Figure 11:
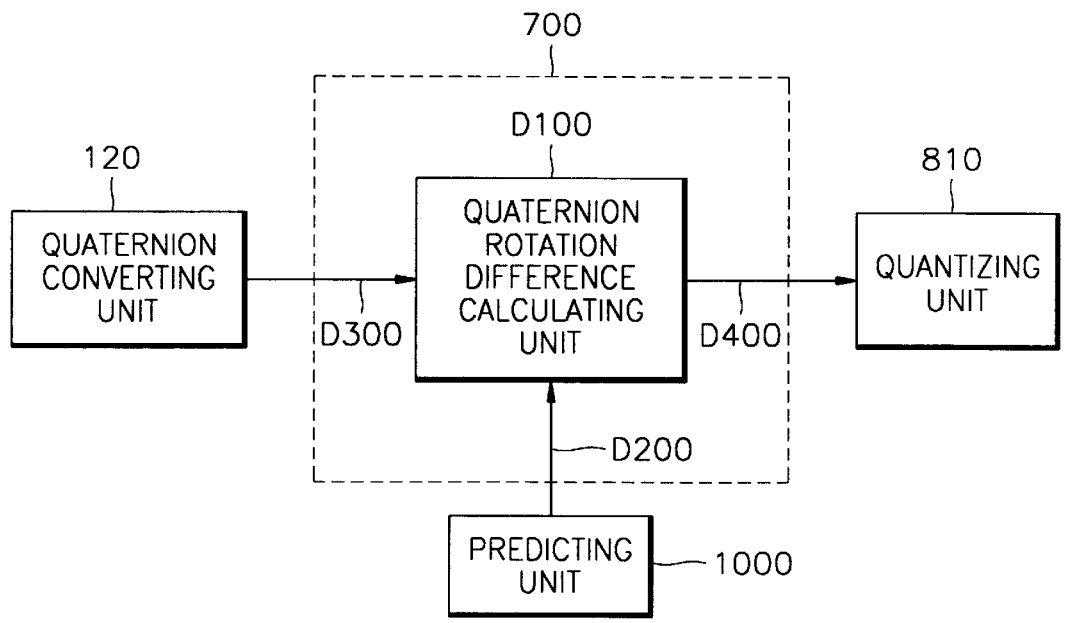

FIG. 10 is a detailed block diagram of the predicting unit 1000.

Referring to FIG. 10, receiving prediction order β, the predicting unit 1000 generates a predictive value as the following equation:

$$\hat{Q}' = \{\hat{Q}_{i-1}(\hat{Q}'_{i-2})^*\}\hat{Q}_{i-1} \qquad (23)$$

That is, a value obtained by rotating the object from previously decoded value $\hat{Q}_{1-1}$ to $\{\hat{Q}_{i-1}(\hat{Q}'_{i-2})^*\}$ is used as the predictive value for a quaternion value which is input at present.

Also, the predicting unit 1000 controls prediction order through the following process. In controlling prediction order, a signal indicating prediction order passes through a rotation gain control unit 1040. A block formed of a delay unit 1030, a quaternion rotation difference calculating unit 1020, and the rotation gain control unit 104 performs the operation of equation 23, and a quaternion multiplier 1050 outputs the result of the operation by the block. At this time, if a predictive order β is applied, the operation of the rotation gain control unit 1040 is performed and the gain control operation is expressed as the following equation 24:

$$Q_P = (\sqrt{1-\beta^{2(1-q_0)^2}}, \beta q_1, \beta q_2, q_3)^T \qquad (25)$$

Here, if β=1, $Q_P = (q_0, q_1, q_2, Q_3)^T$, and if β=0, $Q_P = (1,0,0, 0)^T$. Therefore, if β=0, the quaternion multiplication unit 1050 outputs the output of the delay unit 930 without change, so the output of the predicting unit 1000 of FIG. 10 is the same as the output of the delay unit 930. if β=1, the operation of the quaternion multiplication unit 1050 is multiplication of the output of the delay unit 930 by the output of the quaternion rotation difference calculating unit 1020, so the output of the predicting unit 1000 is the same as the prediction value of equation 23. As this, using prediction order β from β=0 to β=1, the output value of the predicting unit 1000 can be changed continuously. In conclusion, the predicting unit 1000 provided in the present embodiment has the prediction order control function, and therefore the encoding apparatus for an orientation interpolator node according to the present invention has the prediction order control function.

The key frame removing unit 650 removes key frames within an allowable error limit, using similarity in rotational transformation with respect to continuous time changes. The key frame removing unit 650 performs relatively high bit quantization for each key frame, while removes key frames in order of less influence on degradation of visual quality. Therefore, the key frame removing unit 650 generates data similar to that of the prior arts while maintains better quality.

FIGS. 16 through 21 are reference diagram for explaining a process for removing a key frame by the key frame removing unit 650.

Figure 16:
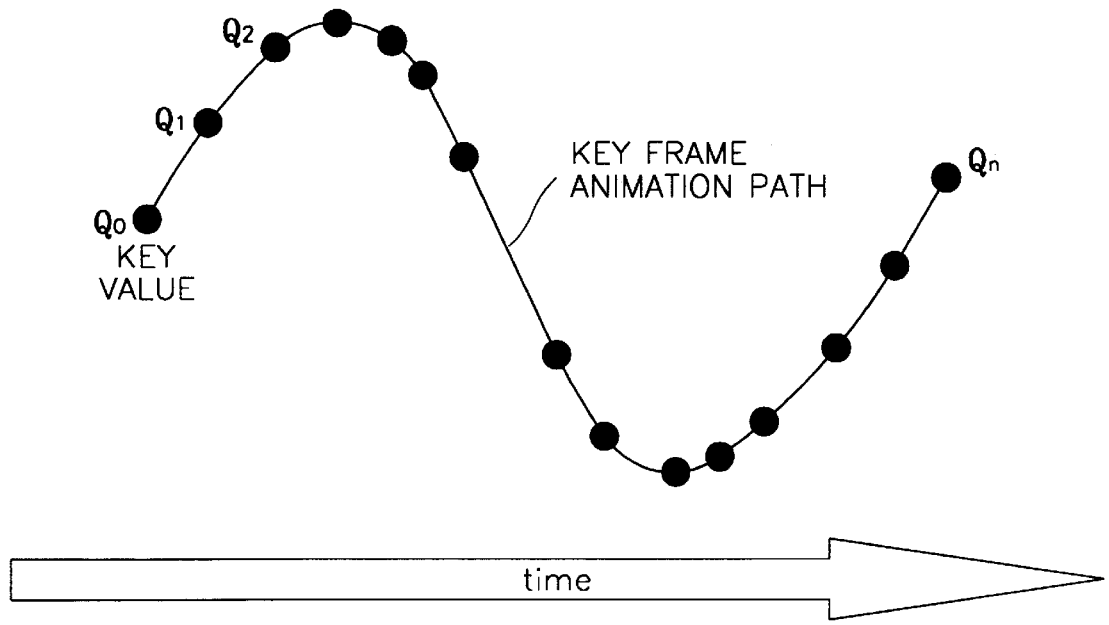

Step 1: Referring to FIG. 16, a black point indicates key values (=$Q_0, Q_1, Q_2, \ldots, Q_n$) of each key frame with respect to n+1 time points on the original animation path.

Figure 17:
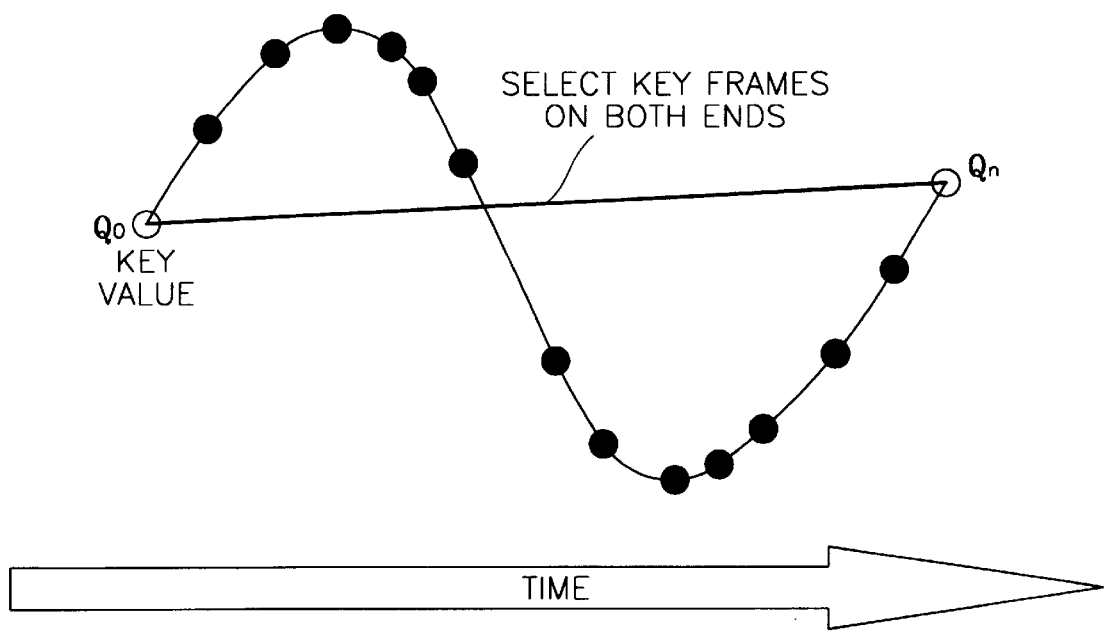

Step 2: As shown in FIG. 17, two key frames (=$Q_0, Q_n$) corresponding to two ends of the animation path among key frames on the animation path are first selected. The selected points are shown as white points.

Figure 18:
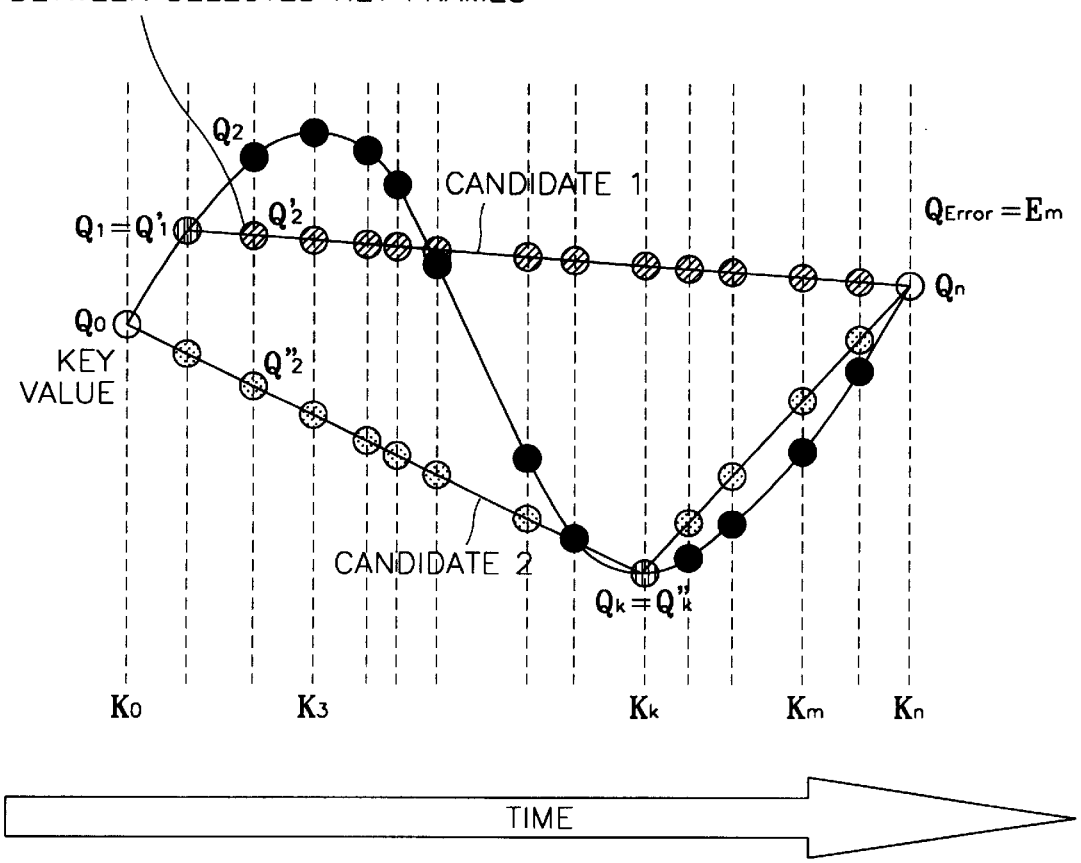

Step 3: As shown in FIG. 18, one key frame among key frames except the selected two end key frame is selected. At this time, the number of methods for selecting one key frame is (n−1). FIG. 18 shows an example in which two candidates are selected and marked by oblique lines. Next, using total three selected key frames ($Q_0, Q_1$, and $Q_n$, or $Q_0, Q_k$, and $Q_n$), spherical linear interpolation is performed for (n−1) candidates which are not selected.

Step 4: By comparing the original animation path and the interpolated (n−1) paths, an animation path which has the least path error is selected and a new key frame from the selected animation path is selected. The error between paths is obtained by using average error $E_m$ described above.

Figure 19:
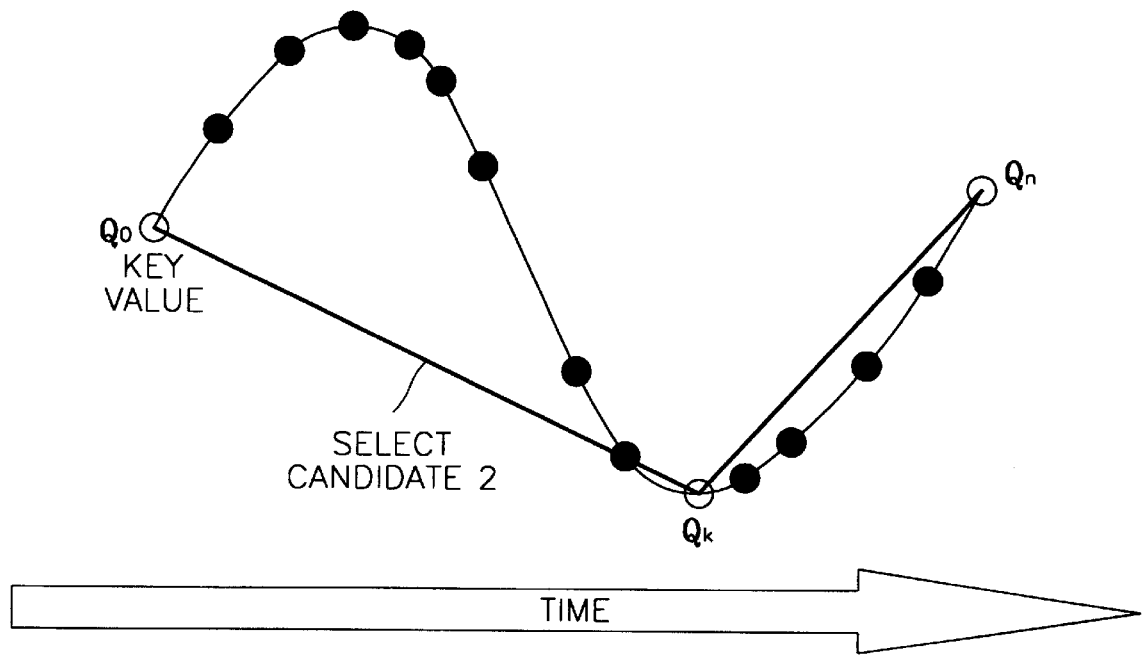

Step 5: FIG. 19 shows an example in which the path of candidate 2 is selected.

Figure 20:
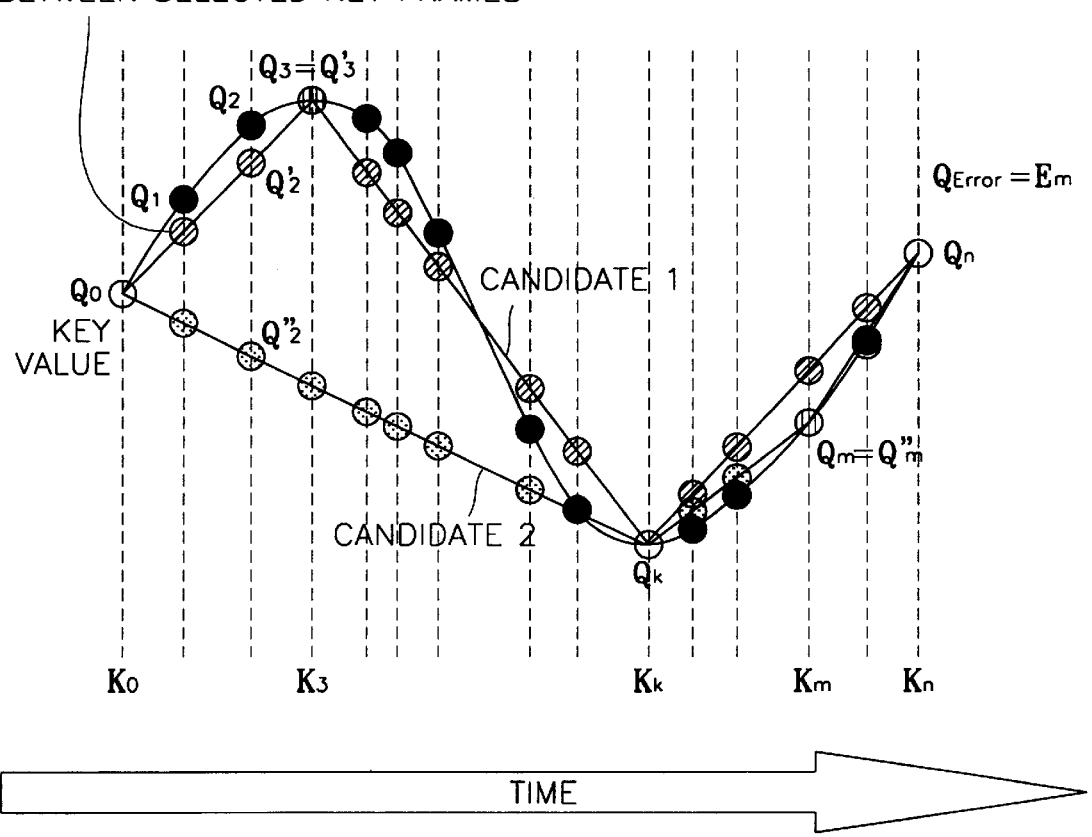

Step 6: As shown in FIG. 20, one key frame among key frames except the three selected key frames is selected. Then, steps 3 and 4 are performed.

Figure 21:
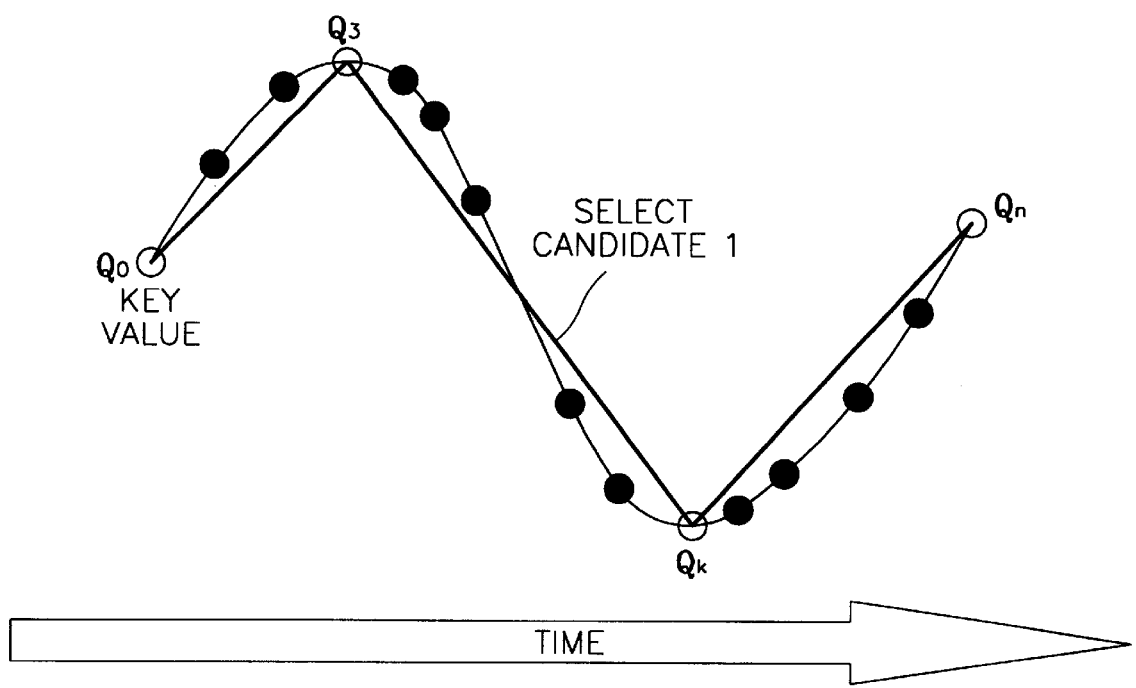

Step 7: FIG. 21 shows an example in which the path of candidate 1 is selected.

Step 8: Steps 6 and 7 are repeatedly performed until the average error becomes less than an allowable error.

Meanwhile, a process for obtaining average error $E_m$ will now be explained. A encoding error is defined as a differential rotation angle in a differential rotation transformation of an original rotational information and a restored rotational information. That is, assuming that ($\vec{r}$, θ) denotes a key value of an orientation interpolator node and ($\vec{r}$, θ) denotes a key value obtained by restoring the key value through the decoding unit ($\vec{r}$ denotes a rotation axis, θ denotes a rotation angle, and the rotation angle satisfies θ∈[−π,π]), when a rotational transformation from an arbitrary position $\vec{x}$ to $\vec{y}$ and $\vec{y}'$ a 3-dimensional space by ($\vec{r}$, θ) and ($\vec{r}'$, θ') is performed, a encoding error occurring is calculated as the difference between $\vec{y}$ and $\vec{y}'$. This makes relation $\vec{e}(\vec{x}) = \vec{y} - \vec{y}'$ of a encoding error vector $\vec{e}(\vec{x})$. In quaternion expression, X, Y, and Y' are defined as the following equations 25:

$$\begin{cases} X = (0, \vec{x}) \\ Y = (0, \vec{y}) \\ Y' = (0, \vec{y}') \end{cases} \quad (25)$$

If $(\vec{r}, \theta)$ and $(\vec{r}', \theta')$ which represent a rotational information are expressed in a quaternion space and referred to as Q and Q', respectively, the following equations 26 are derived:

$$Y = Q*X*Q^*$$
$$X = Q^* *Y*Q \quad (26)$$

Where, A*B indicates quaternion multiplication and A* denotes A's conjugate. Therefore, the following equation 27 is derived:

$$Y' = Q'*X*Q'^* = Q'*Q^* *Y*Q*Q'^* = Q''*Y*Q''^* \quad (27)$$

Where, Q" is a value for indicating the rotational transformation relation between $\vec{y}$ and $\vec{y}'$, and is defined as the following equation 28:

$$Q'' = Q'*Q^* \quad (28)$$

Therefore, if $\theta''$ denotes a differential rotation angle between $\vec{y}$ and $\vec{y}'$, $\theta''$ can be obtained using the quaternion converting equation and equation 29 as the following:

$$\theta''=2\cos^{-1}q_0''2\cos^{-1}(Q'\cdot Q),\ \theta''\epsilon[0\pi],\ q_0''=Q'\cdot Q, \quad (29)$$

(· indicates inner product operation)

Equation 29 indicates an instantaneous encoding error occuring in a predetermined time among all animation key frames. In order to derive an equation for obtaining a encoding error of all animation intervals, equation 29 can be expressed by an instantaneous encoding error at a predetermined time t as the following equation 30:

$$e(t)=2\arccos\{Q(t)\cdot Q'(t)\} \quad (30)$$

If equation 30 is applied to all key frame intervals performing animation through the orientation interpolating method, average error $E_m$ and maximum error $E_p$ for all intervals $[t_0, t_L]$ can be derived as the following equations 31:

$$\begin{cases} E_m = \sqrt{\frac{1}{t_L-t_0}\int_{t_0}^{t_L}e^2(t)dt} \\ E_p = \max_{t_0 \leq t \leq t_L}|e(t)| \end{cases} \quad (31)$$

Here, partial sum $E_m^i$ is first obtained from interval $[t_{i-1}, t_i]$ in order to obtain $E_m$ as the following equation 32:

$$E_m^i = \int_{t_{i-1}}^{t_i} e^2(t)dt = 4\int_{t_{i-1}}^{t_i}\arccos^2\{Q(t)\cdot Q'(t)\}dt \quad (32)$$

Meanwhile, because $4\arccos^2 Q(t)\cdot Q'(t)=\phi^2(a)$, $t=t_{-1}+a(t_i-t_{i-1})$, the following equation 33 is derived:

$$E_m^i=(t_i-t_{i-1})\int_0^1\phi^2(t)dt \quad (33)$$

Because it is difficult to obtain the definite integral of function $\phi^2(\alpha)$ in integral interval [0. 1], approximation is performed as the following equations 34:

$$\phi(a)\cong\phi(0)+a\{\phi(1)-\phi(0)\}$$
$$\phi^2(a)\cong\phi^2(0)+a^2\{\phi(1)-\phi(0)\}^2+2a\phi\{\phi(1)-\phi(0)\} \quad (34)$$

Here, $$\cos\frac{\phi(0)}{2} = Q(t_{i-1})\cdot Q'(t_{i-1}),\text{ and }\cos\frac{\phi(1)}{2} = Q(t_i)\cdot Q'(t_i).$$

Using the approximated function, partial sum $E_m^i$ can be obtained as the following equation 35:

$$E_m^i \cong \frac{1}{3}(t_i - t_{i-1})\{\phi^2(0) + \phi^2(1) + \phi(0)\phi(1)\} \quad (35)$$

Equation 32 can be rearranged as the following equation 36:

$$E_m^i \cong \frac{4}{3}(t_i - t_{i-1})[\arccos^2(Q(t_{i-1})\cdot Q'(t_{i-1})) + \arccos^2(Q(t_i)\cdot \quad (36)$$
$$Q'(t_i))\arccos(Q(t_{i-1})\cdot Q'(t_{i-1}))\arccos(Q(t_i)\cdot Q'(t_i))]$$

Also, partial sum $E_m^i$ is added to all intervals $[t_0, t_L]$ and then average error $E_m$ is obtained as the following equation 37:

$$E_m \cong \sqrt{\frac{1}{t_L - t_0}\sum_{i=1}^{L} E_m^i} \quad (37)$$

To obtain maximum error $E_p$, a maximum value is selected among maximum error $E_p^i$ in each interval $[t_{i-1}, t_i]$ which is obtained by the following equation 38:

$$E_p^i \cong \max_{t_{i-1}\leq t\leq t_i}|e(t)| = \max_{t_{i-1}\leq t\leq t_i} 2|\arccos\{Q(t)\cdot Q'(t)\}| \quad (38)$$

Using the approximation function described above, $E_p^i$ can be approximated as the following equation 39:

$$E_p^i \cong \max\{\phi(0),\phi(1)\}=\max\ \{2|\arccos(Q(t_{i-1})\cdot Q'(t_{i-1}))|,$$
$$2|\arccos(Q(t_i)\cdot Q'(t_i))|\} \quad (39)$$

Maximum error $E_p$ in all intervals $[t_0, t_L]$ is expressed as the following equation 40:

$$E_p \cong \max_{i=1,\ldots,L} E_p^i \quad (40)$$

Figure 12:
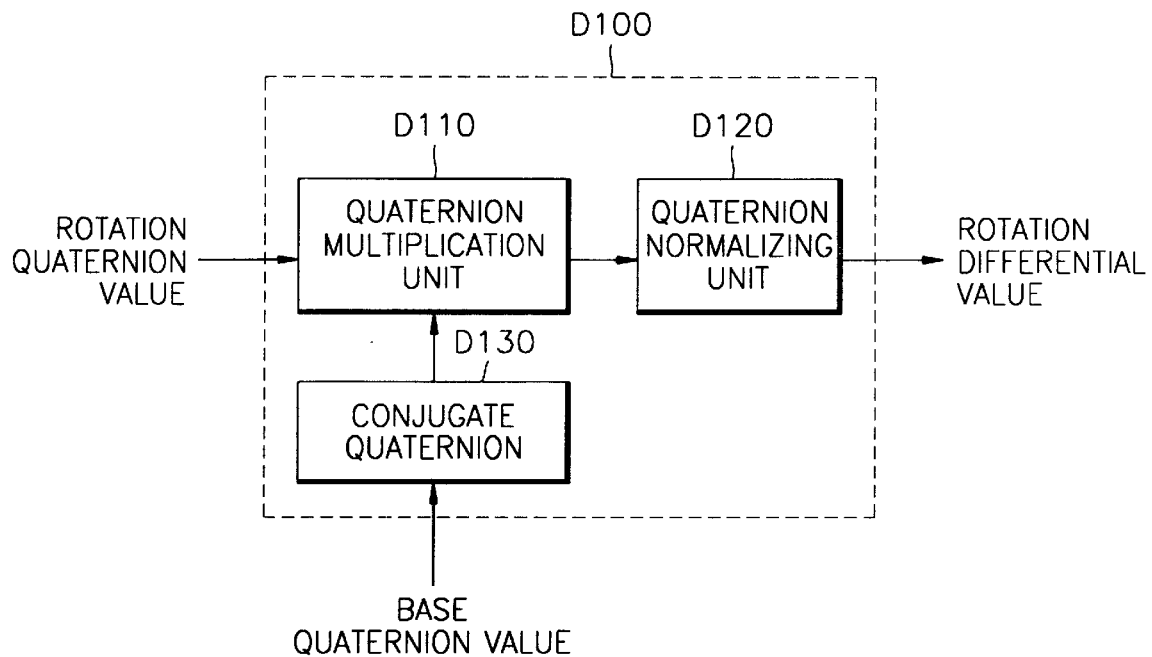

FIG. 12 is a diagram in which the calculation for obtaining the differential rotation value between two quaternions described above is formed as one macro block.

Referring to FIG. 12, the principle for obtaining a differential rotation value will now be explained. Assuming that a base value is D200 and a rotation value is D300 in the two quaternion input values, an operation D130 for obtaining the conjugate of the base value is performed, muliplication D110 by the rotation value is performed, quaternion normalization D120 is performed and then the result is output. This calculation for obtaining the quaternion difference value is frequently used in the present embodiment and each part which needs the quaternion processing and therefore it is convenient to regard it as one single macro block.

Figure 15:
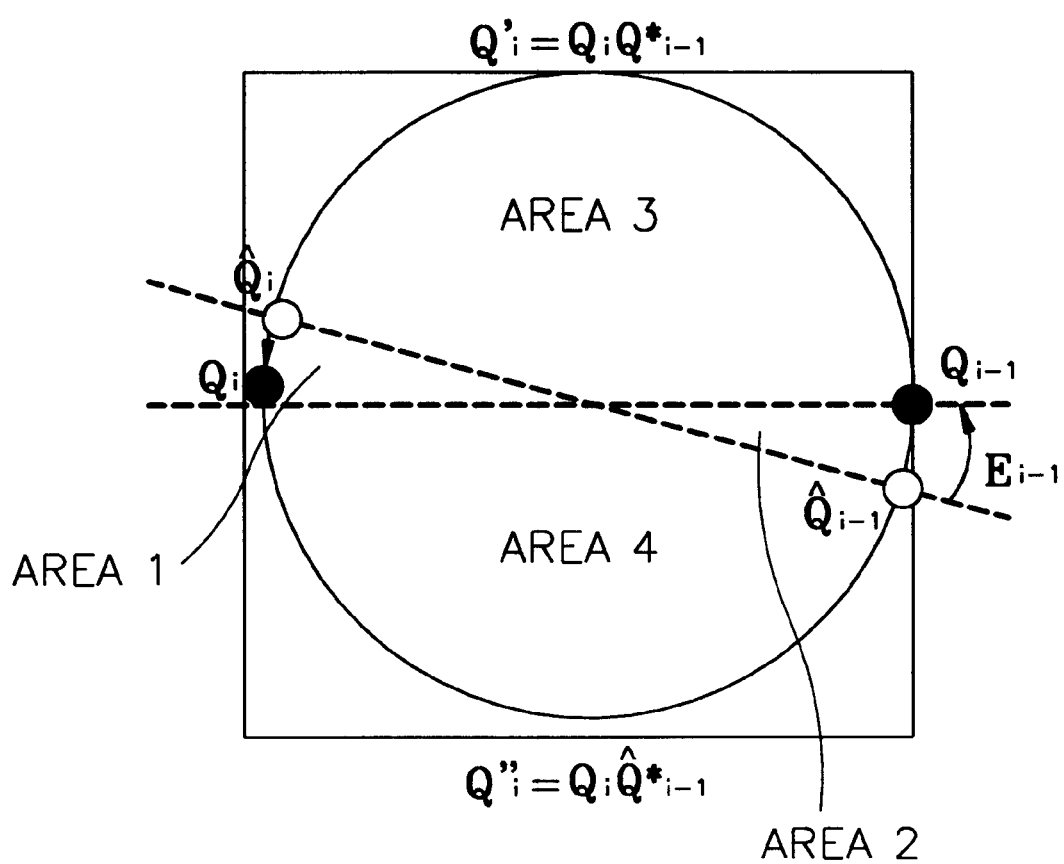

FIG. 15 is a reference diagram for explaining a rotation direction error in quaternion encoding using a differential rotation. The rotation direction error occurs because the quaternion encoding is a loss encoding.

Referring to FIG. 15, assuming that $Q_i$ denotes the position of the object based on rotational information which is input at present, and $Q_{i-1}$ denotes the previous position of the object, the relation of the two positions can be expressed by four different areas. That is, if the object rotates from the position $Q_{i-1}$ to $Q_i$ through the shortest arc and the relation of the two positions is in area 1 or area 3, i.e., the current position $Q_i$ lies on the arc in area 1 or 3, the object rotates counterclockwise from $Q_{i-1}$ to $Q_i$. Also if the object rotates from the position $Q_{i-1}$ to $Q_i$ through the shortest arc and the relation of the two positions is in area 2 or area 4, i.e., the current position $Q_1$ lies on the arc in area 2 or 4, the object rotates clockwise from $Q_{i-1}$ to $Q_i$. If the object rotates according to rotational information which is encoded and then decoded, the decoding unit rotates the object using two values: decoded information $\hat{Q}_{i-1}$ corresponding to original rotational information $Q_{i-1}$, and $\hat{Q}_i$ corresponding to $Q_i$. Therefore, referring to FIG. 15 again, the position of $\hat{Q}_i$ against $\hat{Q}_{i-1}$ is in area 2 and area 3, the object rotates counterclockwise and if the position is in area 1 and area 4, the object rotates clockwise. As this, rotating the object using the original rotational information and rotating the object using decoded rotational information cause opposite direction in case of area 1 and area 2 . This is because in quaternion encoding, lossy encoding is performed and therefore $Q_i$ is not the same as $\hat{Q}_i$. This occurs inevitably in lossy encoding. Because area I and area 2 are essential areas, an operation for eliminating reverse rotation or for making the rotation direction the same as the original direction is needed. In the present embodiment, the latter operation is adopted.

Briefly explaining a rotation direction correction function, referring to FIG. 15, areas 1 and 2 where an rotation direction error occurs are detected, differential quaternion value to be encoded is compulsorily controlled so that the rotation direction is the same as the original rotation direction. Though the inconsistence of rotation directions also occurs in area 2, in area 2 unlike area 1, the original quaternion value and the restored quaternion value are converging . Therefore, the rotation direction correction function is performed in area I and not in area 2.

Figure 13:
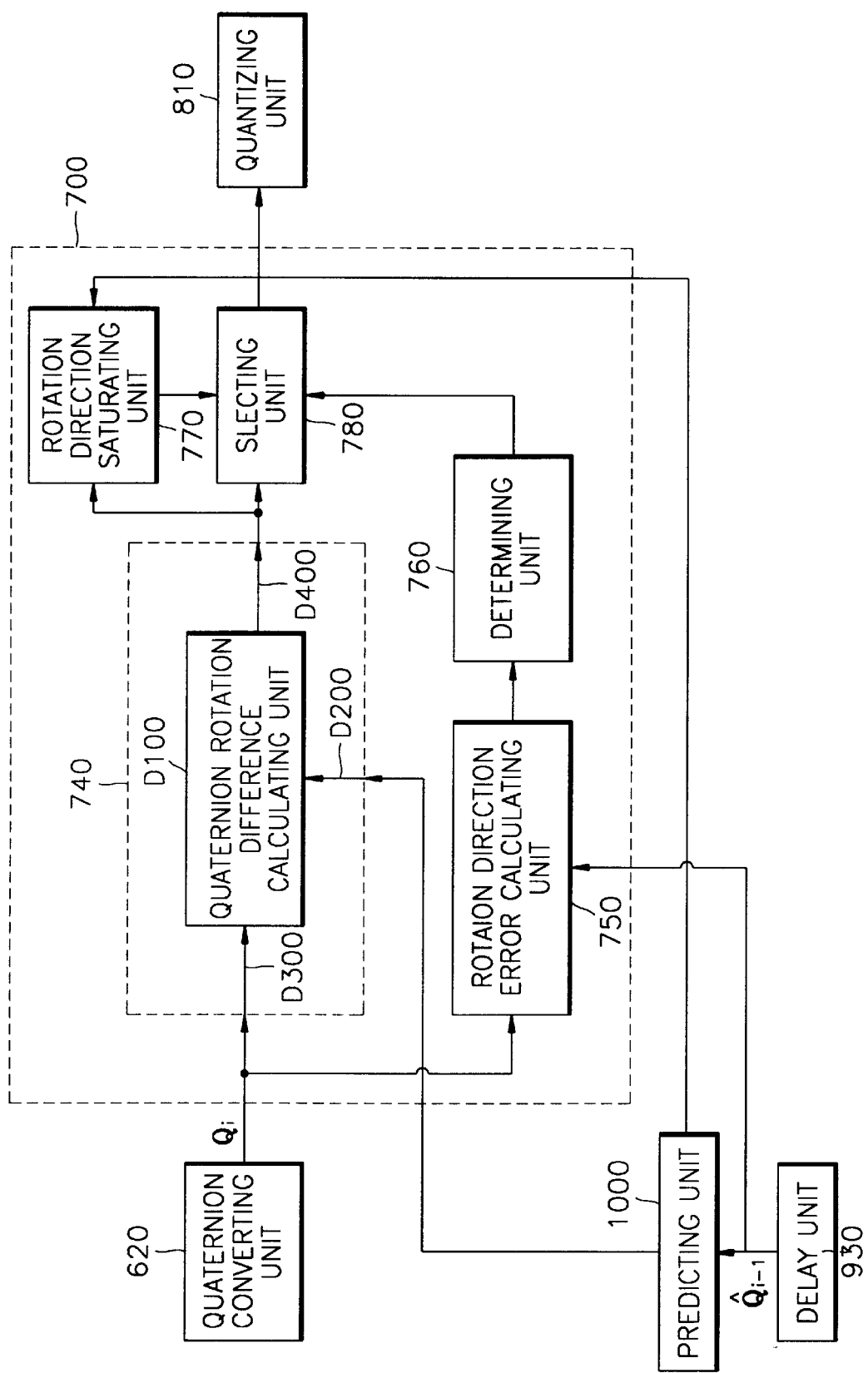
Figure 14:
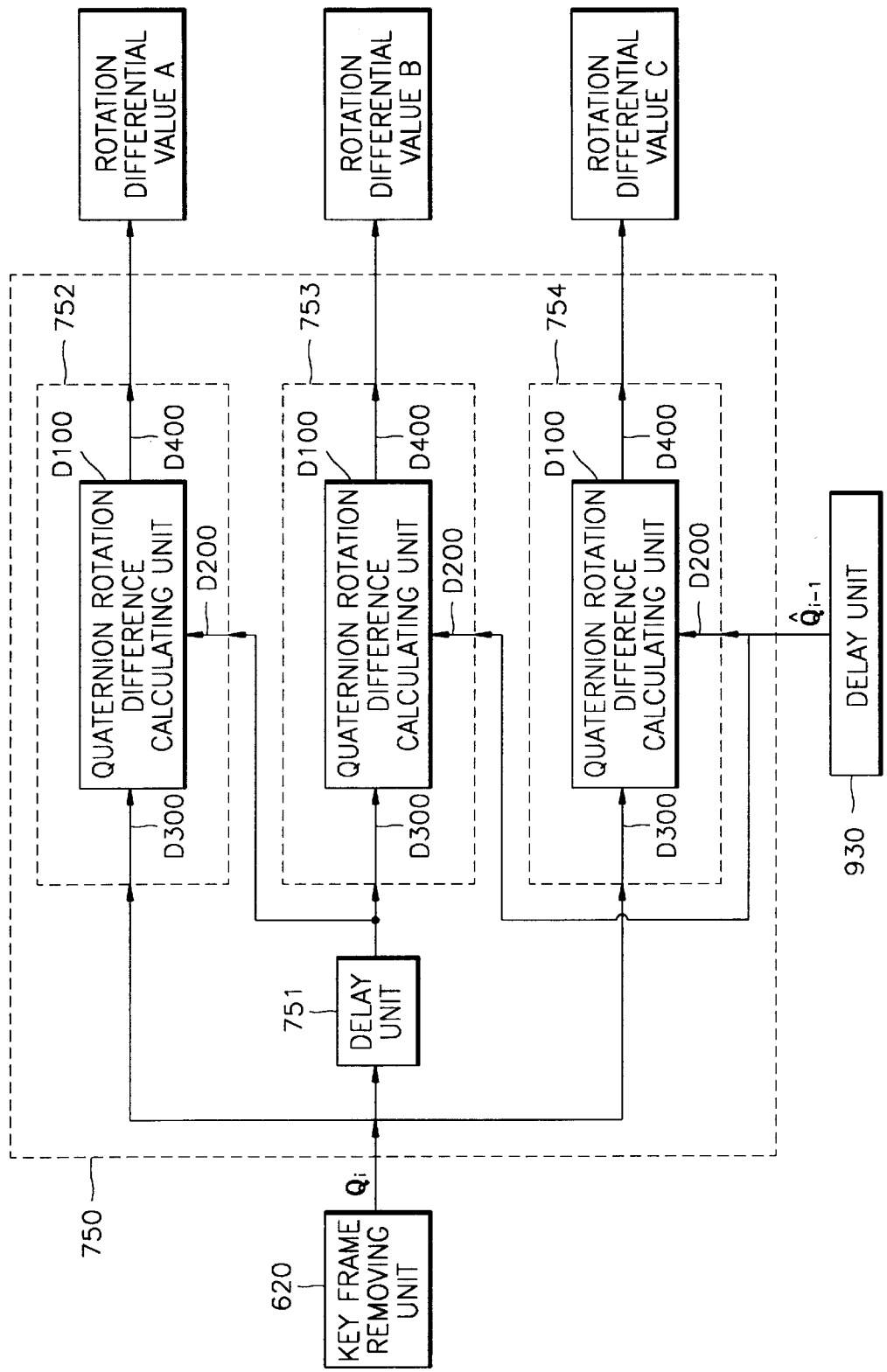

FIGS. 13 and 14 are block diagrams for explaining the rotation direction correction function of the encoding apparatus of FIG. 8.

Referring FIG. 13 and 14, a rotation direction error calculating unit 750 and a determining unit 760 detects the case of area 1. As shown in FIG. 14, the rotation direction error calculating unit 750 includes quaternion rotation difference calculating units 752, 753, and 754 for calculating three differential rotation quaternion values. Obtained three differential rotation values A, B, and C are as the following:

differential rotation value A: $Q_i(Q_{i-1})^*$

Here, differential rotation value A indicates the rotation direction of the object in a time interval $[t_{i-1}, t_i]$ by the original rotational information.

differential rotation value B: $Q_{i-1}(\hat{Q}_{i-1})^*$

Here, differential rotation value B indicates the rotation error and direction of the object due to an encoding error at time $t_{i-1}$.

differential rotation value C: $Q_i(\hat{Q}_{i-1})^*$

Here, differential rotation value C indicates the direction of differential quaternion information to be provided for encoding at time $t_i$.

The determining unit 760 determines whether it is lie on the arc in area 1 as explained in FIG. 15, using the three differential rotation values A, B, and C. If it is the case of area I , the determining unit 780 selects an input from a rotation direction saturating unit 770 for setting the rotation direction to a saturated value, so that the rotation direction is corrected to the same as the original direction. If it is not the case of area 1, the determining unit 780 selects an input from the quaternion difference calculating unit 740 so that the rotation direction correction function is performed nothing. The operation at this time is the same as the above-described case, in which a differential quaternion value is obtained and provided to the quantizing unit 805. The principle of the operation of the determining unit 760 will now be explained in detail. The determining unit 760 includes five determining units, and outputs the result of ANDing five logical value outputs. Five logical operations included in the determining unit 760 are as the following:

$$\text{Logical expression } A: \begin{pmatrix} q_{A,1} \\ q_{A,2} \\ q_{A,3} \end{pmatrix} \cdot \begin{pmatrix} q_{C,1} \\ q_{C,2} \\ q_{C,3} \end{pmatrix} < 0$$

Here, if differential rotation value A of FIG. 14 is $Q_A$, and $Q_A = (q_{A,0}, q_{A,1}, q_{A,2}, q_{A,3})^T$, $$\begin{pmatrix} q_{A,1} \\ q_{A,2} \\ q_{A,3} \end{pmatrix}$$

indicates a 3-dimensional vector $(q_{A,1} q_{A,2}, q_{A,3})^T$ which is formed of three elements except the first element $q_{A,0}$ among the four elements. Likewise, $$\begin{pmatrix} q_{C,1} \\ q_{C,2} \\ q_{C,3} \end{pmatrix}$$

indicates a 3-dimensional vector formed of three elements except the first element in differential rotation value C of FIG. 14.

$$\begin{pmatrix} q_{A,1} \\ q_{A,2} \\ q_{A,3} \end{pmatrix} \cdot \begin{pmatrix} q_{C,1} \\ q_{C,2} \\ q_{C,3} \end{pmatrix}$$

indicates the inner product of two 3-dimensional vectors. If the inner product is a negative number, logical value A is defined as 'true', and otherwise it is defined as 'false'.

$$\text{Logical expression } B: \begin{pmatrix} q_{B,1} \\ q_{B,2} \\ q_{B,3} \end{pmatrix} \cdot \begin{pmatrix} q_{C,1} \\ q_{C,2} \\ q_{C,3} \end{pmatrix} < 0$$

Here, $$\begin{pmatrix} q_{B,1} \\ q_{B,2} \\ q_{B,3} \end{pmatrix}$$

indicates a 3-dimensional vector $(q_{B,1}, q_{B,2}, q_{B,3})^T$ which is formed of three elements except the first element in differential rotation value B of FIG. 14.

$$\begin{pmatrix} q_{C,1} \\ q_{C,2} \\ q_{C,3} \end{pmatrix}$$

indicates a 3-dimensional vector formed of three elements except the first element in differential rotation value C of FIG. 14.

$$\begin{pmatrix} q_{B,1} \\ q_{B,2} \\ q_{B,3} \end{pmatrix} \cdot \begin{pmatrix} q_{C,1} \\ q_{C,2} \\ q_{C,3} \end{pmatrix}$$

indicates the inner product of two 3-dimensional vectors. If the inner product is a negative number, logical value B is defined as 'true', and otherwise it is defined as 'false'.

$$A_{TH} < 2\cos^{-1}|q_{A,0}| \quad \text{Logical expression C:}$$

Here, $q_{A,0}$ indicates the first element in differential rotation value A of FIG. 14, as described in logical expressions A and B. If the result of performing logical expression C using the absolute value of $q_{A,0}$ is greater than a predetermined constant $A_{TH}$, logical expression C is defined as 'true' and otherwise it is defined as 'false'. At this time, the constant $A_{TH}$ is set to a value close to 0 (for example, 0.02) and may be set to an appropriate value depending on an actual operation.

$$A_{TH} < 2\cos^{-1}|q_{B,0}| \quad \text{Logical expression D:}$$

Here, $q_{B,0}$ indicates the first element in differential rotation value B of FIG. 14, as described in logical expressions A and B. If the result of performing logical expression D using the absolute value of $q_{B,0}$ is greater than a predetermined constant $A_{TH}$, logical expression D is defined as 'true' and otherwise it is defined as 'false'. At this time, the constant $A_{TH}$ is set as in logical expression C.

$$A_{TH} < 2\cos^{-1}|q_{C,0}| \quad \text{Logical expression E:}$$

Here, $q_{C,0}$ indicates the first element in differential rotation value C of FIG. 14, as described in logical expressions A and B. If the result of performing logical expression E using the absolute value of $q_{C,0}$ is greater than a predetermined constant $A_{TH}$, logical expression E is defined as 'true' and otherwise it is defined as 'false'. At this time, the constant $A_{TH}$ is set to a value close to 0 (for example, 0.02) and may be set to an appropriate value depending on an actual operation.

If AND operation is performed for the five obtained logical values as the following equation 41, the output of the determining unit 760 of FIG. 13 is generated.

Output of determining unit 960: (logical expression A) AND (logical expression B) AND (logical expression C) AND (logical expression D) AND (logical expression E) . . . (41)

If the logic value of equation 41 is 'true', the selecting unit 780 receives the output of the rotation direction saturating unit 770 and outputs the received signal. If the logic value is 'false', the selecting unit 780 receives the output of the quaternion difference calculating unit 740 and outputs the received signal.

The operation of the rotation direction saturating unit 770 will now be explained. Referring FIG. 15 again, in case of area 1, rotational information which the decoding unit received is $\hat{Q}_i$ and rotational information which is input at present is $Q_i$, and therefore the decoding unit rotates the object clockwise. However, since according to the original rotation direction, the object rotates from $Q_{i-1}$ to $Q_i$, the object should rotate counterclockwise. Therefore, the rotation direction saturating unit 770 makes the object rotate from $\hat{Q}_i$ in a direction the same as the original direction, that is, in a direction having the largest counterclockwise movement. That is, the rotation directin saturing unit 770 sets new rotational information with which the object can rotate to a position close to 180 degree from $\hat{Q}_i$. Accordingly, the rotation direction can be corrected as the original rotation direction and a rotation error can be minimized.

The operation of the rotation direction saturating unit 970 is expressed as the following equation 41:

$$Q_s = \begin{pmatrix} |\delta_T| \\ -\dfrac{1}{\sqrt{q_{R,1}^2 + q_{R,2}^2 + q_{R,3}^2}} q_{R,1} \\ -\dfrac{1}{\sqrt{q_{R,1}^2 + q_{R,2}^2 + q_{R,3}^2}} q_{R,2} \\ -\dfrac{1}{\sqrt{q_{R,1}^2 + q_{R,2}^2 + q_{R,3}^2}} q_{R,3} \end{pmatrix} * \begin{pmatrix} +q_{P,0} \\ -q_{P,1} \\ -q_{P,2} \\ -q_{P,3} \end{pmatrix} \quad (42)$$

Where, $(q_{p,0}, q_{p,1}, q_{p,2}, q_{p,3})^T$ indicates the output of rotation gain adjusting value of FIG. 13, $(q_{R,0}, q_{R,1}, q_{R,2}, q_{R,3})$ indicates the output value of the quaternion difference calculating unit 740, and $\delta_T$ is a constant close to 0 (for example, 0.001) and is determined with respect to the precision of encoding apparatus.

As described above, in encoding the data of an orientation interpolator node, the present invention removes data redundancy in a time region and bit redundancy among quantized symbols, and improves data transmission efficiency by reflecting physical characteristics of a rotational movement and removing additional information for elements.

What is claimed is:

1. An encoding/decoding apparatus for an orientation interpolator node data which provides rotational information of an object in a 3-dimensional space, the encoding/decoding apparatus comprising:

a differential modulation processing unit for performing differential pulse code modulation (DPCM) by converting key value of data having a key and key values into a quaternion form;

a quantizing unit for quantizing the DPCM processed key value data and outputting the quantized key value data;

a variable length encoding unit for variable length encoding the quantized differential key value data;

an inverse quantizing unit for inverse quantizing the quantized differential key value data and outputting the inverse quantized differential key value data;

a quaternion multiplication unit for performing quaternion multiplication of the inverse quantized differential key value data and multiplying the result of a previously decoded key value;

a delay unit for delaying the output of the quaternion multiplication unit; and a predicting unit having a prediction order control function which receives the output of the delay predicts an input value to be encoded next, and can adjust the prediction order.

2. The encoding/decoding apparatus for an orientation interpolator node of claim 1, wherein the predicting unit comprises:

a quaternion multiplication unit for generating a value which is the product of all differential rotation values that are restored prior to a time point indicated by quaternion information which is input at present;

a delay unit for generating time series information by multiple delaying the outputs of the quaternion multiplication unit;

a multiplier for generating a predictive value of a current rotational information which is generated by a linear combination on a quaternion space of the output values of the delay unit; and a predictor for receiving the output of the multiplier and a prediction order which specifies a weighted value between the prediction values, and performing order-variable prediction operation by a linear combination having the output of the multiplier and the weighted value between the prediction values.

3. The encoding/decoding apparatus of an orientation interpolator node of claim 2, further comprising:

a rotation direction correction unit for, when a differential quaternion value is generated in the predictor and the differential pulse code modulation processing unit, performing rotation direction correction function which makes the object rotate in the same direction as the rotation direction indicated by the original rotational information.

4. The encoding/decoding apparatus of an orientation interpolator node of claim 1, further comprising:

a rotation direction correction unit for, when a differential quaternion value is generated in the predictor and the differential pulse code modulation processing unit, performing rotation direction correction function which makes the object rotate in the same direction as the rotation direction indicated by the original rotational information.

5. The encoding/decoding apparatus of an orientation interpolator node of claim 1, wherein in removing a key and key value information corresponding to the key, the key frame removing unit removes a key and key value information corresponding to the key if the difference between an animation path after removing the key and key value information and the animation path before removing the key and key value information is less than a predetermined reference value.

* * * * *